US010869209B2

(12) United States Patent
Hahn et al.

(10) Patent No.: US 10,869,209 B2
(45) Date of Patent: Dec. 15, 2020

(54) METHOD AND DEVICE FOR TRANSMITTING/RECEIVING DATA TO/FROM BASE STATION IN WIRELESS COMMUNICATION SYSTEM

(71) Applicant: LG ELECTRONICS INC., Seoul (KR)

(72) Inventors: Genebeck Hahn, Seoul (KR); Heejeong Cho, Seoul (KR); Eunjong Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/766,664

(22) PCT Filed: Oct. 6, 2015

(86) PCT No.: PCT/KR2015/010566
§ 371 (c)(1),
(2) Date: Apr. 6, 2018

(87) PCT Pub. No.: WO2017/061643
PCT Pub. Date: Apr. 13, 2017

(65) Prior Publication Data
US 2018/0302813 A1 Oct. 18, 2018

(51) Int. Cl.
*H04W 24/08* (2009.01)
*H04W 36/08* (2009.01)
(Continued)

(52) U.S. Cl.
CPC .......... *H04W 24/08* (2013.01); *H04W 24/10* (2013.01); *H04W 36/08* (2013.01); *H04W 36/30* (2013.01);
(Continued)

(58) Field of Classification Search
CPC ..... H04W 24/08; H04W 76/10; H04W 24/10; H04W 36/08; H04W 36/30; H04W 56/001; H04W 84/042
See application file for complete search history.

(56) References Cited

U.S. PATENT DOCUMENTS 6,771,964 B1 * 8/2004 Einola ............... H04W 36/0066
370/331
8,300,598 B2 * 10/2012 Kim ...................... H04W 36/26
370/328

(Continued)

FOREIGN PATENT DOCUMENTS

EP     2863701 A1    4/2015
WO  WO 2015/014503 A1  2/2015

*Primary Examiner* — Huy D Vu
*Assistant Examiner* — Bailor C. Hsu
(74) *Attorney, Agent, or Firm* — Birch, Stewart, Kolasch & Birch, LLP

(57) ABSTRACT

The present specification may provide a method for transmitting/receiving data in a wireless communication system, the method being performed by a terminal and comprising the steps of: transmitting, to one or more alternative base stations having an alternative link configured, an activation request message for requesting the activation of the alternative link into a signaling radio bearer (SRB) active state; receiving, from the one or more alternative base stations as a response to the activation request message, an activation response message comprising load status information of the one or more alternative base stations; on the basis of the load status information, determining a serving base station candidate for activating the alternative link into the SRB active state; and transmitting, to the determined serving base station candidate, an activation completion message indicating that the alternative link has been activated into the SRB active state.

11 Claims, 29 Drawing Sheets

(51) Int. Cl.
*H04W 36/30* (2009.01)
*H04W 56/00* (2009.01)
*H04W 76/10* (2018.01)
*H04W 24/10* (2009.01)
*H04W 84/04* (2009.01)

(52) U.S. Cl.
CPC ......... *H04W 56/001* (2013.01); *H04W 76/10* (2018.02); *H04W 84/042* (2013.01)

(56) References Cited

U.S. PATENT DOCUMENTS

| | | | | |
|---|---|---|---|---|
| 8,599,791 | B2* | 12/2013 | Mukherjee | H04W 36/0022 370/331 |
| 8,693,360 | B2* | 4/2014 | Liu | H04W 36/30 370/252 |
| 8,880,078 | B2* | 11/2014 | Kim | H04W 24/04 370/332 |
| 9,042,881 | B2* | 5/2015 | Kwon | H04B 1/1027 455/423 |
| 9,173,192 | B2* | 10/2015 | Zhang | H04W 36/0007 |
| 9,232,503 | B2* | 1/2016 | He | H04W 72/0406 |
| 9,380,618 | B2* | 6/2016 | Peng | H04W 72/0406 |
| 9,674,754 | B2* | 6/2017 | Fitzpatrick | H04W 36/30 |
| 9,723,533 | B2* | 8/2017 | Nigam | H04W 36/30 |
| 2010/0103845 | A1* | 4/2010 | Ulupinar | H04L 29/12207 370/254 |
| 2011/0105119 | A1* | 5/2011 | Bienas | H04W 36/0055 455/436 |
| 2012/0046066 | A1* | 2/2012 | Tamura | H04L 1/0029 455/525 |
| 2012/0082105 | A1* | 4/2012 | Hwang | H04W 76/30 370/329 |
| 2012/0236707 | A1 | 9/2012 | Larsson et al. | |
| 2013/0039287 | A1* | 2/2013 | Rayavarapu | H04W 68/005 370/329 |
| 2014/0056243 | A1 | 2/2014 | Pelletier et al. | |
| 2014/0079022 | A1* | 3/2014 | Wang | H04W 36/22 370/331 |
| 2014/0219248 | A1* | 8/2014 | Reddiboyana | H04W 76/15 370/331 |
| 2015/0045088 | A1 | 2/2015 | Chen | |
| 2015/0065143 | A1 | 3/2015 | Hsu et al. | |
| 2015/0245263 | A1 | 8/2015 | Cho | |
| 2016/0057800 | A1* | 2/2016 | Ingale | H04W 56/0005 370/216 |
| 2016/0277956 | A1* | 9/2016 | Lindheimer | H04W 36/22 |

* cited by examiner

FIG. 5
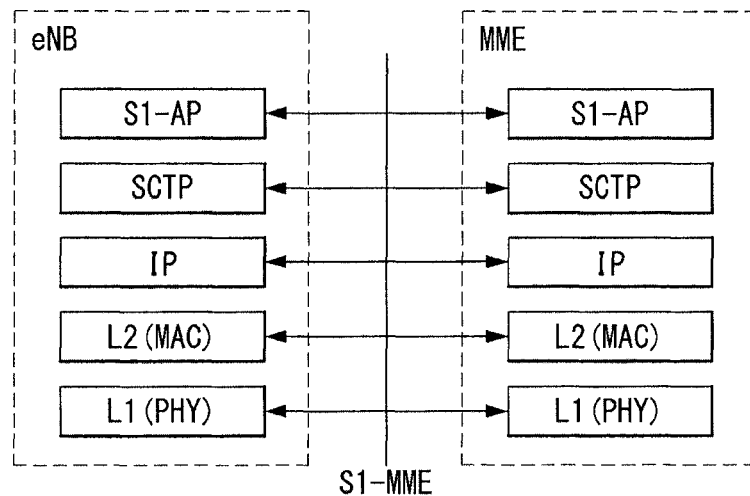
(a) control-plane protocol stack
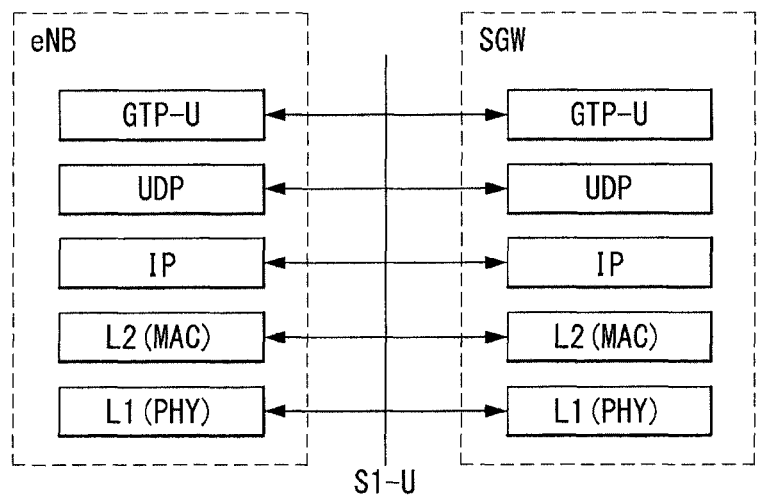
(b) user-plane protocol stack

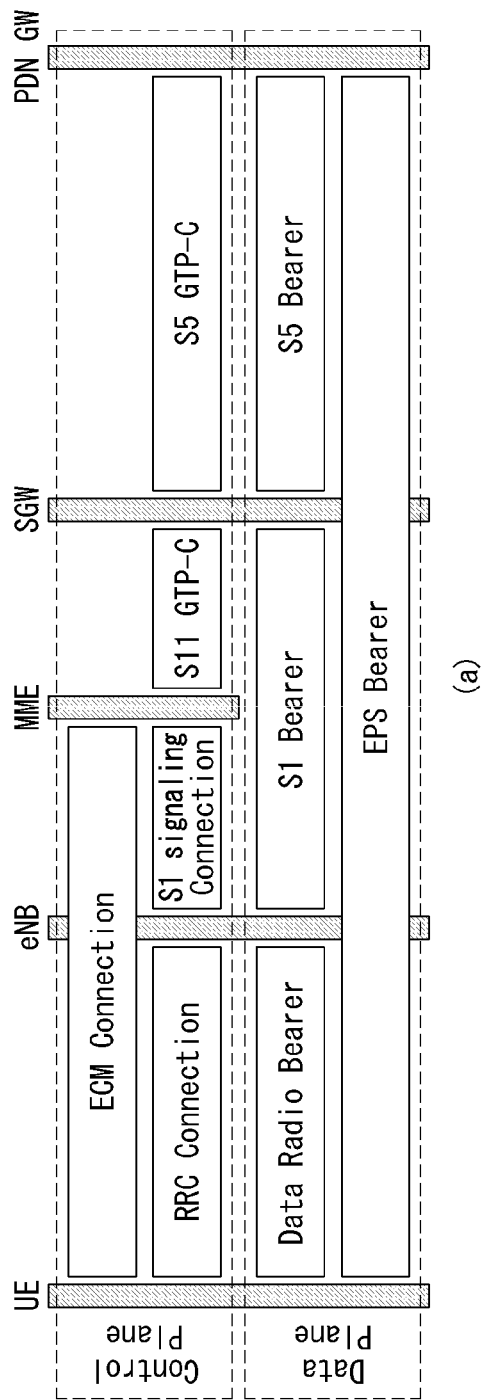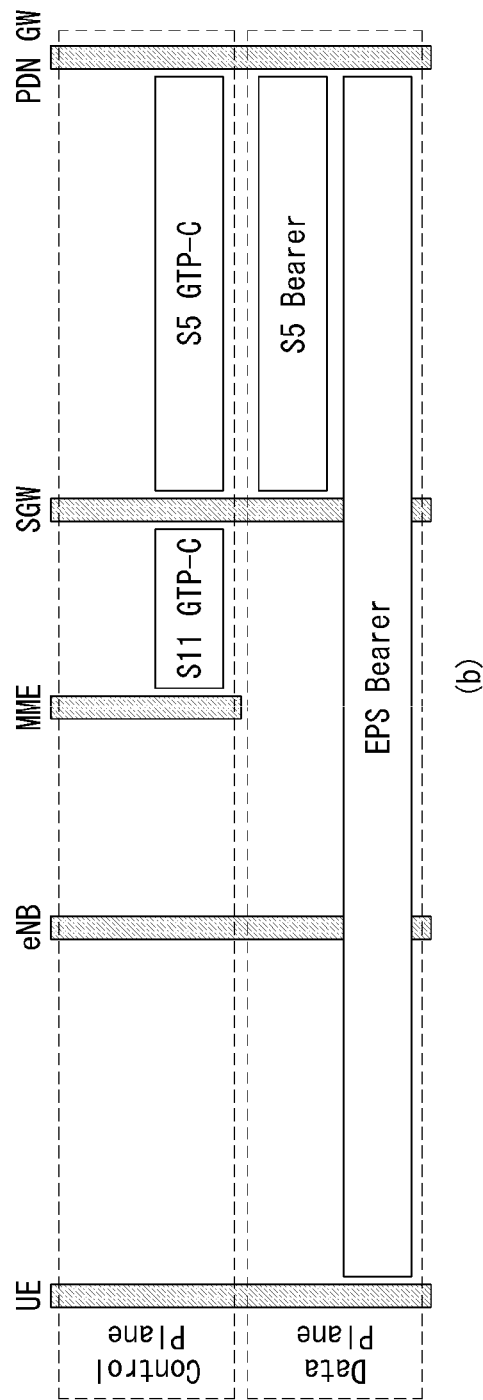
Fig. 8

FIG. 23

| | Message | Delay (ms) | Message | Delay (ms) |
|---|---|---|---|---|
| 1 | T310 Timer | 50 | | |
| 2 | 4-Step UL Resource Allocation | 16.5 | 4-Step UL Resource Allocation | 16.5 |
| 3 | RRC Connection Re-establishment Request | 1+4(5) | RRC Connection Activation Request | 1+4(5) |
| 4 | RRC Connection Re-establishment | 1+4(5) | RRC Connection Activation Notification | 5+4(9) |
| 5 | RRC Connection Re-establishment Complete | 1+4(5) | RRC Connection Activation Confirmation | 5+4(9) |
| 6 | UE Information Request | 1+4(5) | RRC Connection Activation | 1+4(5) |
| 7 | UE Information Response | 1+4(5) | RRC Connection Activation Complete | 1+4(5) |
| 8 | RLF Indication | 5+4(9) | RRC Connection Release Request | 1+4(5) |
| 9 | | | RRC Connection Release Complete (Optional) | 1+4(5) |
| Total | | 100.5ms | | 54.5ms (59.5ms) |

FIG. 24

|   | Message | Delay (ms) | Message | Delay (ms) |
|---|---------|------------|---------|------------|
| 1 | T310 Timer | 50 | | |
| 2 | 4-Step UL Resource Allocation | 16.5 | 4-Step UL Resource Allocation | 16.5 |
| 3 | RRC Connection Re-establishment Request | 1+4(5) | RRC Connection Activation Request | 1+4(5) |
| 4 | RRC Connection Re-establishment | 1+4(5) | RRC Connection Activation Notification | 5+4(9) |
| 5 | RRC Connection Re-establishment Complete | 1+4(5) | RRC Connection Activation Confirmation | 5+4(9) |
| 6 | UE Information Request | 1+4(5) | RRC Connection Activation | 1+4(5) |
| 7 | UE Information Response | 1+4(5) | RRC Connection Activation Complete | 1+4(5) |
| 8 | RLF Indication | 5+4(9) | RRC Connection Release Request (Optional) | 1+4(5) |
| 9 | | | RRC Connection Release Complete (Optional) | |
| Total | | 100.5ms | | 49.5ms (59.5ms) |

FIG. 25

| | Message | Delay (ms) | Message | Delay (ms) |
|---|---|---|---|---|
| 1 | T310 Timer | 50 | | |
| 2 | 4-Step UL Resource Allocation | 16.5 | 4-Step UL Resource Allocation * N (Number of alternative eNBs) | 16.5 * N |
| 3 | RRC Connection Re-establishment Request | 1+4(5) | RRC Connection Activation Request * N (Number of alternative eNBs) | 1+4(5) * N |
| 4 | RRC Connection Re-establishment | 1+4(5) | RRC Connection Activation Transmission Timing Alignment | 5+4(9) |
| 5 | RRC Connection Re-establishment Complete | 1+4(5) | RRC Connection Activation * N (Number of alternative eNBs) | 1+4(5) * N |
| 6 | UE Information Request | 1+4(5) | RRC Connection Activation Complete | 1+4(5) |
| 7 | UE Information Response | 1+4(5) | RRC Connection Activation Complete | 5+4(9) |
| 8 | RLF Indication | 5+4(9) | RRC Connection Release Request | 1+4(5) |
| | | | RRC Connection Release Complete (Optional) | 1+4(5) |
| Total | | 100.5ms | | 26.5 * N + 28ms (26.5 * N + 33ms) |

FIG. 26

|   | Message | Delay (ms) | Message | Delay (ms) |
|---|---------|------------|---------|------------|
| 1 | T310 Timer | 50 | | |
| 2 | 4-Step UL Resource Allocation | 16.5 | 4-Step UL Resource Allocation * N (Number of alternative eNBs) | 16.5 * N |
| 3 | RRC Connection Re-establishment Request | 1+4(5) | RRC Connection Activation Request * N (Number of alternative eNBs) | 1+4(5) * N |
| 4 | RRC Connection Re-establishment | 1+4(5) | RRC Connection Activation Transmission Timing Alignment | 5+4(9) |
| 5 | RRC Connection Re-establishment Complete | 1+4(5) | RRC Connection Activation * N (Number of alternative eNBs) | 1+4(5) * N |
| 6 | UE Information Request | 1+4(5) | RRC Connection Activation Complete | 1+4(5) |
| 7 | UE Information Response | 1+4(5) | RRC Connection Activation Complete | 5+4(9) |
| 8 | RLF Indication | 5+4(9) | RRC Connection Release Request (Optional) | 1+4(5) |
|   |  |  | RRC Connection Release Complete (Optional) | 1+4(5) |
| Total |  | 100.5ms |  | 26.5 * N + 23ms (26.5 * N + 33ms) |

FIG. 27

| | Message | Delay (ms) | Message | Delay (ms) |
|---|---|---|---|---|
| 1 | T310 Timer | 50 | | |
| 2 | 4-Step UL Resource Allocation | 16.5 | 4-Step UL Resource Allocation | 16.5 |
| 3 | RRC Connection Re-establishment Request | 1+4(5) | RRC Connection Activation Request | 1+4(5) |
| 4 | RRC Connection Re-establishment | 1+4(5) | RRC Connection Activation Transmission Timing Alignment | 5+4(9) * 2 |
| 5 | RRC Connection Re-establishment Complete | 1+4(5) | RRC Connection Activation * N (Number of alternative eNBs) | 1+4(5) * N |
| 6 | UE Information Request | 1+4(5) | RRC Connection Activation Complete | 1+4(5) |
| 7 | UE Information Response | 5+4(9) | RRC Connection Activation Complete | 5+4(9) |
| 8 | RLF Indication | 5+4(9) | RRC Connection Release Request | 1+4(5) |
| | | | RRC Connection Release Complete (Optional) | 1+4(5) |
| Total | | 100.5ms | | 5 * N + 58.5ms (5 * N + 63.5ms) |

FIG. 28

| | Message | Delay (ms) | Message | Delay (ms) |
|---|---|---|---|---|
| 1 | T310 Timer | 50 | | |
| 2 | 4-Step UL Resource Allocation | 16.5 | 4-Step UL Resource Allocation | 16.5 |
| 3 | RRC Connection Re-establishment Request | 1+4(5) | RRC Connection Activation Request | 1+4(5) |
| 4 | RRC Connection Re-establishment | 1+4(5) | RRC Connection Activation Transmission Timing Alignment | 5+4(9) * 2 |
| 5 | RRC Connection Re-establishment Complete | 1+4(5) | RRC Connection Activation * N (대체 기지국의 수) | 1+4(5) * N |
| 6 | UE Information Request | 1+4(5) | RRC Connection Activation Complete | 1+4(5) |
| 7 | UE Information Response | 1+4(5) | RRC Connection Activation Complete | 5+4(9) |
| 8 | RLF Indication | 5+4(9) | RRC Connection Release Request (Optional) | 1+4(5) |
| | | | RRC Connection Release Complete (Optional) | 1+4(5) |
| Total | | 100.5ms | | 5 * N + 53.5ms (5 * N + 63.5ms) |

METHOD AND DEVICE FOR TRANSMITTING/RECEIVING DATA TO/FROM BASE STATION IN WIRELESS COMMUNICATION SYSTEM

CROSS REFERENCE TO RELATED APPLICATIONS

This application is the National Phase of PCT International Application No. PCT/KR2015/010566, filed on Oct. 6, 2015, all of which are hereby expressly incorporated by reference into the present application.

TECHNICAL FIELD

The present specification relates to a method for a terminal to send and receive data to and from a base station in a wireless communication system, and more particularly, to a method for a terminal to send and receive control information for updating a base station and an apparatus supporting the same.

BACKGROUND ART

Mobile communication systems have been developed to provide voice services while guaranteeing user mobility. Such mobile communication systems have expanded their coverage from voice services through data services up to high-speed data services. However, as current mobile communication systems suffer resource shortages and users demand even higher-speed services, the development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as dual connectivity, massive Multiple Input Multiple Output (MIMO), in-band full duplex, non-orthogonal multiple access (NOMA), supporting super-wide band, and device networking, have been researched.

DISCLOSURE

Technical Problem

Currently, the radio link availability of LTE/LTE-A systems entirely depends on network coverage rate, which is as high as approximately 95%.

Moreover, it is assumed that, as for the radio link reliability of LTE/LTE-A systems, sufficient reliability can be provided by H-ARQ retransmission since BER (Block Error Rate) is 10-1 in the case of unicast data through PDSCH without separating a control plane (C-Plane) and a user plane (U-Plane).

Despite the fact that LTE/LTE-A systems have currently become highly active and provide various services, they do not provide connectivity that always ensures reliability for mission critical services (MCSs) in in every time slot.

Since LTE/LTE-A systems are designed to deliver relatively good connectivity most of the time, they provide a data rate near '0' in a specific poor coverage area where there is too much interference or network resources are overloaded.

In the future, it is expected that new MCSs will emerge that largely depend on the availability/reliability of radio links to satisfy a high level of communication quality, and the advancement of wireless technology for embracing such new MCSs is needed.

Accordingly, an aspect of the present specification is to provide a method for shifting away from 'Best Effort Mobile Broadband' of current LTE/LTE-A systems towards "Truly Reliable Communication" of 5G.

In other words, an object of the present specification is to provide a method for avoiding radio link failure, which employs a radio link of an alternative eNB to prevent link outage to an eNB for UEs receiving MCSs in the future 5G mobile communication system.

Also, an object of the present specification is to provide a method for receiving MCSs continuously by activating a radio link of an alternative eNB when a UE is expected to suffer link outage to a serving eNB, in other words, when a radio link to the serving eNB is degraded.

Also, an object of the present specification is to provide a method for securing availability of a radio link by deactivating a radio link of an alternative eNB without releasing a radio link between a UE and a serving eNB when the radio link is recovered within a predetermined time period.

In providing smart car safety services and remote control services in the medical/industrial/robotic applications, methods proposed in the present specification are intended to realize adaptive radio link connection control for improving quality of a radio link of a UE for the applications requiring high reliability (packet error rate $<10^{-6}$) while satisfying a low transmission delay requirement of less than 1 ms.

Searching for and maintaining an alternative eNB in addition to a radio link used by a UE implies that the UE supports to always keep radio links satisfying the minimum QoE requirements for MCSs within a specific geographical area.

Technical objects to be achieved by the present invention are not limited to the aforementioned technical objects, and other technical objects not described above may be evidently understood by those skilled in the art to which the present invention pertains from the following description.

Technical Solution

In a method for transmitting and receiving data in a wireless communication system, the method performed by a UE includes transmitting, a request message for a Signaling Radio Bearer (SRB) activation to one or more alternative base stations to which an alternate link is established; receiving, from the one or more alternative eNBs, an activation message including load status information of the one or more alternative eNBs in response to the request message; transmitting an activation completion message to a candidate serving eNB, which is one of the one or more alternative eNBs based on the load status information, wherein the request message includes a cause field indicating a reason of SRB activation, and the reason of SRB activation is radio link failure avoidance of the serving eNB.

Also, according to the present invention, the request message further includes a synchronization information indicating a synchronization order among the one or more alternative eNBs, and the activation message is transmitted according to the synchronization order.

Also, according to the present invention, the synchronization order is a sequence of fast synchronization or a sequence of slow synchronization from the UE.

Also, according to the present invention, the load status information is one of high, medium, or low state.

Also, according to the present invention, the activation message further includes configuration information related to configuring radio resources of the one or more alternative eNBs.

Also, according to the present invention, the activation complete message includes at least one of list information of other alternative eNBs in the SRB inactive state or alternative eNB information indicating candidate alternative eNBs for setting up an alternative link.

Also, according to the present invention, the method further includes receiving, from the candidate serving eNB, an RRC connection reconfiguration message including C-RNTI assigned to the UE by the candidate alternative eNB to which an alternative link for the UE is established.

Also, according to the present invention, the request message further includes timer information representing a timer for discovering the radio link failure.

Also, according to the present invention, the method further includes, starting the timer, when degradation of radio link quality of the serving eNB is detected; and transmitting an inactivation request message requesting inactivation of a Signaling Radio Bearer (SRB) to the candidate alternative eNB, when quality of the radio link is recovered before the timer is completed.

Also, according to the present invention, load status of the candidate serving eNB is the lowest one among the one or more candidate eNBs.

Also, the present invention provides a method including transmitting a request message for SRB activation to one or more alternative eNBs to which alternative links are established; receiving an activation message for SRB activation from a candidate serving eNB which is one alternative eNB among the one or more alternative eNBs; and transmitting an activation complete message to the candidate serving eNB in response to the activation message, wherein the request message includes a cause field indicating a reason of SRB activation, and the reason of SRB activation is radio link failure avoidance of the serving link.

Also, according to the present invention, the activation message further includes configuration information related to configuring radio resources of the one or more alternative eNBs.

Also, according to the present invention, the activation complete message includes list information indicating other alternative eNBs in the SRB inactive status.

Also, according to the present invention, the method further includes receiving, from the candidate serving eNB, an RRC connection reconfiguration message including C-RNTI indicating an identifier of the UE assigned by a candidate alternative eNB to which an alternative link for the UE is established, wherein an alternative link is set up between the candidate alternative eNB and the UE.

Also, according to the present invention, the request message further includes timer information indicating a timer for discovering the radio link failure.

Also, according to the present invention, the method further includes, starting the timer, when degradation of radio link quality of a serving eNB is detected; and transmitting an inactivation request message requesting inactivation of a Signaling Radio Bearer (SRB) to the candidate alternative eNB, when quality of the radio link is recovered before the timer is completed.

Also, according to the present invention, the candidate serving eNB is an alternative eNB selected by the serving eNB among the one or more alternative eNBs.

Also, according to the present invention, load status of the candidate serving eNB is the lowest one among the one or more alternative eNBs.

Also, the present invention provides a UE including a communication unit transmitting and receiving a radio signal to and from the outside; and a processor functionally connected to the communication unit, wherein the processor is configured to transmit a request message for a Signaling Radio Bearer (SRB) activation to one or more alternative base stations to which an alternate link is established; to receive, from the one or more alternative eNBs, an activation message including load status information of the one or more alternative eNBs in response to the request message; and, to transmit an activation completion message to a candidate serving eNB, which is one of the one or more alternative eNBs based on the load status information, wherein the request message includes a cause field indicating a reason of SRB activation, and the reason of SRB activation is radio link failure avoidance of the serving eNB.

Also, the present invention provides a UE including a communication unit transmitting and receiving a radio signal to and from the outside; and a processor functionally connected to the communication unit, wherein the processor is configured to transmit, to one or more alternative eNBs configured for alternative links, a request message for a Signaling Radio Bearer (SRB) activation; to receive, from the one or more alternative eNBs, an activation message for SRB activation from a candidate serving eNB, which is one of the one or more alternative eNBs; and to transmit an activation complete message to the candidate serving eNB in response to the activation message, wherein the request message includes a cause field indicating a reason of SRB activation, and the reason of SRB activation is radio link failure avoidance of the serving eNB.

Advantageous Effects

According to the present specification, when a Radio Link Failure (RLF) is expected due to degradation of radio link quality of a serving eNB, a UE activates a radio link of an alternative eNB, thereby avoiding an RLF.

Also, according to the present specification, by detecting degradation of radio link quality of a serving eNB and thereby avoiding an RLF, a possibility to encounter a situation in which a UE is not in the RRC connected state may be reduced.

Also, according to the present invention, a UE directly activates radio links of alternative eNBs, thereby securing enough of service availability for receiving MCSs.

Also, according to the present invention, a UE always secures a nearby alternative eNB available for the purpose of avoiding an RLF, thereby realizing highly reliable cloud connectivity and improving data rate.

The technical effects of the present invention are not limited to the technical effects described above, and other technical effects not mentioned herein may be understood to those skilled in the art to which the present invention belongs from the description below.

DESCRIPTION OF DRAWINGS

FIG. 5 illustrates an S1 interface protocol structure in a wireless communication system to which the present invention may apply.

FIG. 8 is a diagram illustrating transmission paths of a control plane and a user plane in an EMM registration state in a wireless communication system to which the present invention may apply.

FIGS. 23 to 28 compare recovery time from a Radio Link Failure (RLF) according to the present invention.

MODE FOR INVENTION

Figure 1:
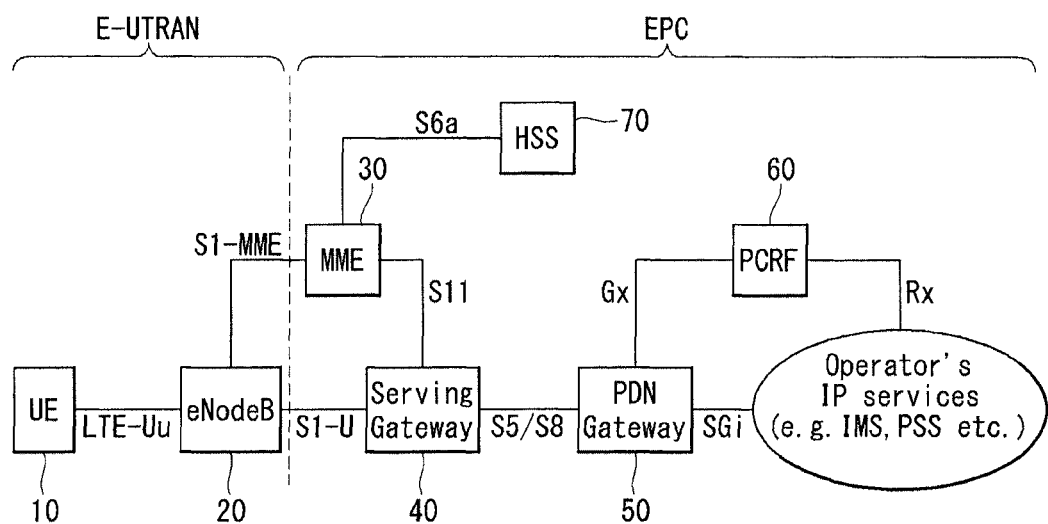
FIG. 1 is a view illustrating an Evolved Packet System which is associated with the Long Term Evolution (LTE) system to which the present invention may apply.

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc.

The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Prior to going further to the description taken in conjunction with the drawings, the terms used herein are briefly defined for ease of understanding.

EPS: abbreviation of Evolved Packet System. Means a core network supporting a long term evolution (LTE) network. An evolved network of UMTS.

PDN (public data network): independent network where a servicing server is positioned.

APN (access point name): Name of an access point managed by a network, which is provided to UE. That is, the name of PDN (character string). Based on the name of the access point, a PDN for transmission/reception of data is determined.

TEID (tunnel endpoint identifier): End point ID of a tunnel configured between nodes in a network, configured per period on a per UE bearer basis.

MME: abbreviation of Mobility Management Entity. Functions to control each entity in the EPS to provide mobility and session for the UE.

Session: path for data transmission, and its unit may be PDN, bearer, or IP flow.

The differences between the units may be divided into an overall target network unit (APN or PDN unit), a unit separated with QoS therein (bearer unit), and a destination IP address unit as defined in 3GPP.

PDN connection: refers to connection from a terminal to PDN, i.e., correlation (connection) between a terminal represented in an IP address and PDN represented in APN.

This means connection (terminal-PDN GW) between entities in the core network so that the session may be formed.

UE context: circumstance information of UE used to manage the UE in the network. That is, circumstance information consisting of UE id, mobility (e.g., current position), or attribute of session (QoS, priority, etc.).

FIG. 1 is a view illustrating an Evolved Packet System which is associated with the Long Term Evolution (LTE) system to which the present invention may apply.

The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers.

As depicted in FIG. 1, the node (logical or physical) of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE.

When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA).

Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
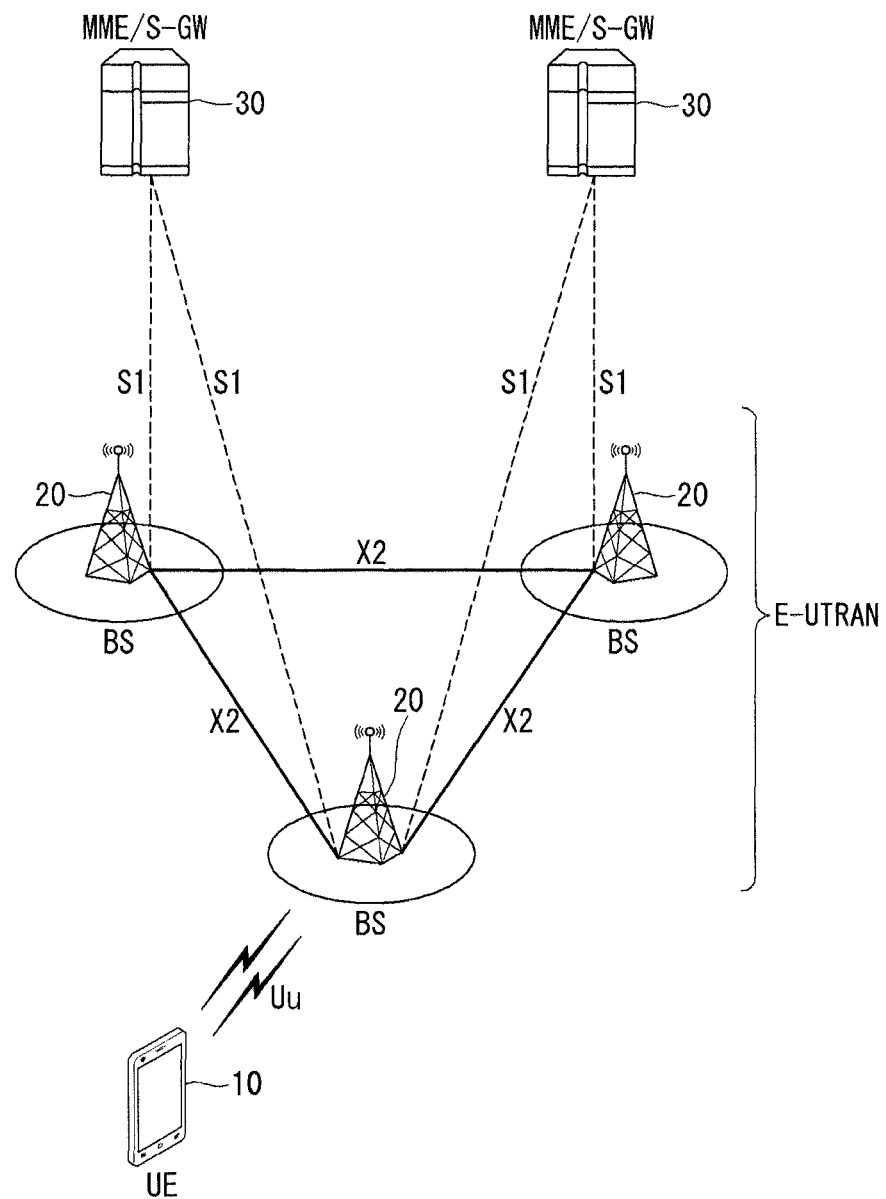
FIG. 2 illustrates a wireless communication system to which the present invention applies.

FIG. 2 illustrates a wireless communication system to which the present invention applies.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10.

The base stations 20 are interconnected by means of an X2 interface. The base stations 20 are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the base station.

Figure 3:
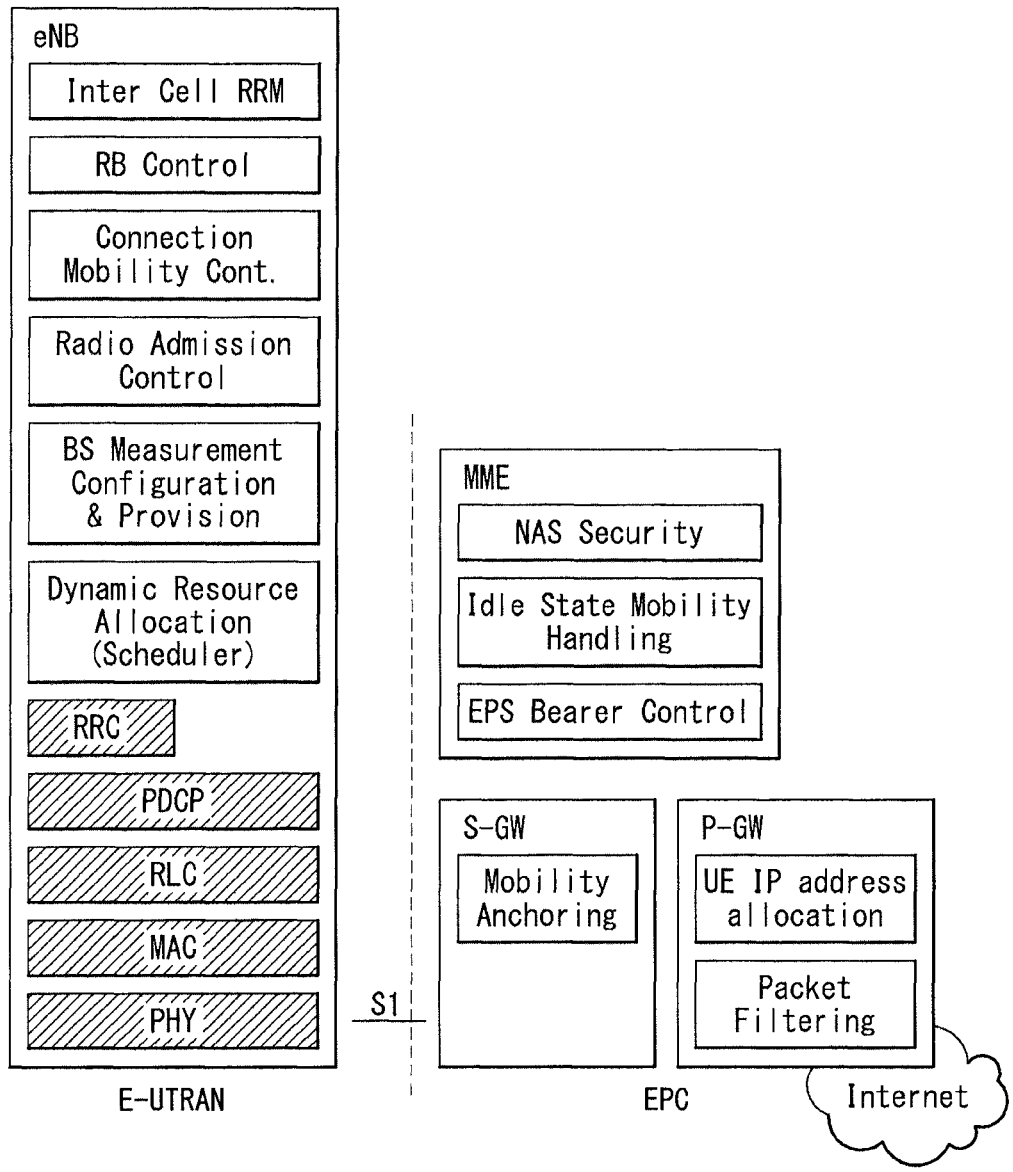
FIG. 3 illustrates a functional split of an E-UTRAN and an EPC to which the present invention may apply.

FIG. 3 illustrates a functional split of an E-UTRAN and an EPC to which the present invention may apply.

Referring to the FIG. 3, shaded blocks represent radio protocol layers, and empty blocks represent functional entities of the control plane.

The base station performs the following functions: (1) radio resource management (RRM) function such as radio bearer (RB) control, radio admission control, connection mobility control, dynamic resource allocation to the UE; (2) IP (Internet Protocol) header compression and decryption of user data stream; (3) routing of user plane data to a serving gateway (S-GW); (4) scheduling and transmission of a paging message; (5) scheduling and transmission of broadcast information; and (6) measurement for mobility and scheduling and establishing a measurement report.

An MME performs the following functions: (1) distribution of paging messages to base stations; (2) security control; (3) idle state mobility control; (4) S bearer control; (5) ciphering and integrity protection of NAS (Non-Access Stratum) signaling.

The S-GW performs the following functions: (1) termination of a user plane packet with respect to paging; and (2) user plane switching to support UE mobility.

Figure 4:
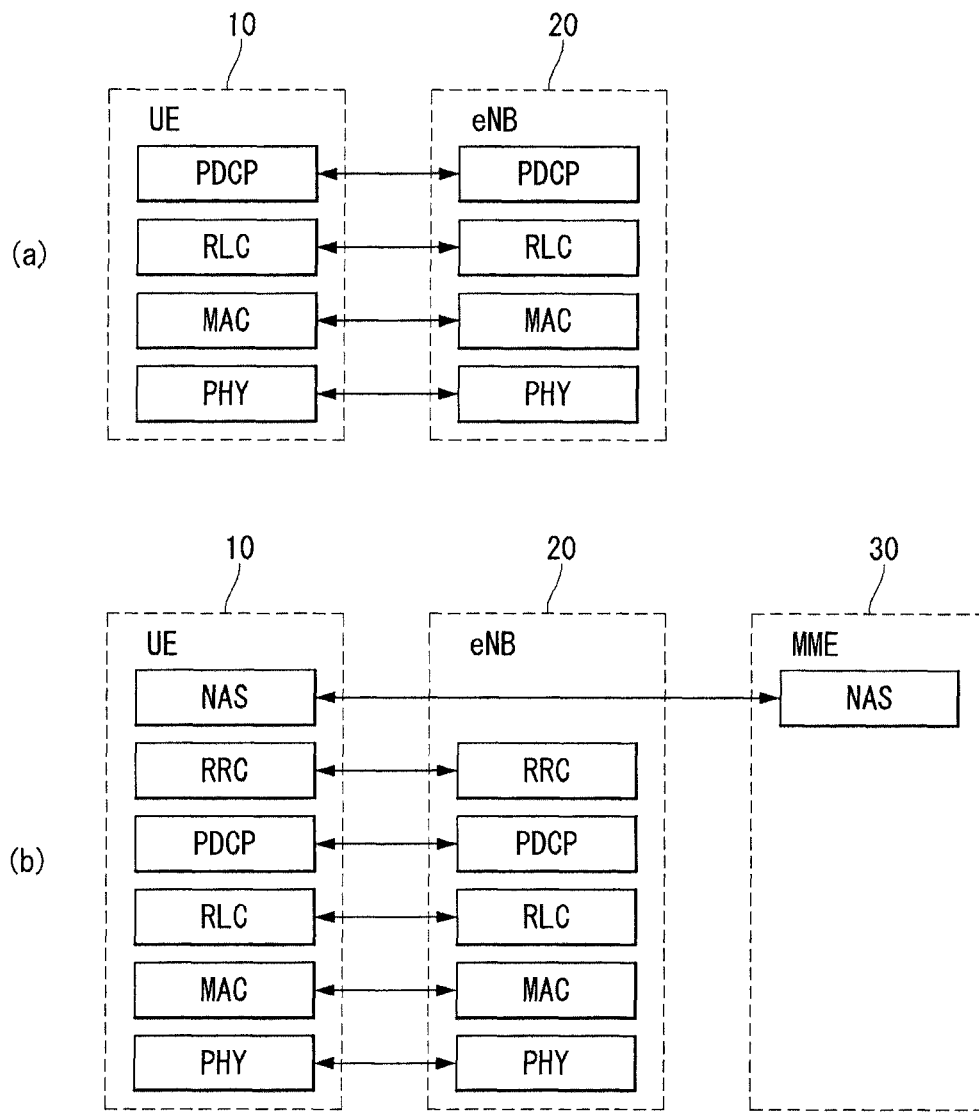
FIG. 4 is a diagram illustrating a radio protocol architecture to which technical features of the present specifications are applicable.

FIG. 4 is a diagram illustrating a radio protocol architecture to which technical features of the present specifications are applicable.

Referring to FIG. 4, (a) of FIG. 4 illustrates an example of a radio protocol architecture for a user plane for user data transmission, and (b) of FIG. 4 illustrates an example of a radio protocol architecture for a control plane for control signal transmission.

A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission.

FIG. 5 illustrates an S1 interface protocol structure in a wireless communication system to which the present invention may apply.

(a) of FIG. 5 illustrates the control plane protocol stack in the S1 interface, and (b) of FIG. 5 illustrates the user plane interface protocol structure in the S1 interface.

With reference to FIG. 5, the S1 control plane interface (S1-MME) is defined between the eNB and the MME. The transport network layer is built on IP transport, similarly to the user plane, but for the reliable transport of signaling messages SCTP is added on top of IP. The application layer signaling protocol is referred to as S1-AP (S1 Application Protocol).

The SCTP layer provides guaranteed delivery of application layer messages.

The transport IP layer employs point-to-point transmission for Protocol Data Unit (PDU) signaling transmission.

For each S1-MME interface instance, a single SCTP association uses a pair of stream identifiers for the S1-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying UE-specific S1-MME signaling transmission bearer. The communication context identifier is delivered within each S1-AP message.

If the S1 signaling transport layer notifies the S1AP layer of disconnection of signaling, the MME changes the state of the UE which has used the corresponding signaling connection to ECM-IDLE state. Furthermore, the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

EMM and ECM States

EPS Mobility Management (EMM) and EPS Connection Management (ECM) states will be described.

Figure 6:
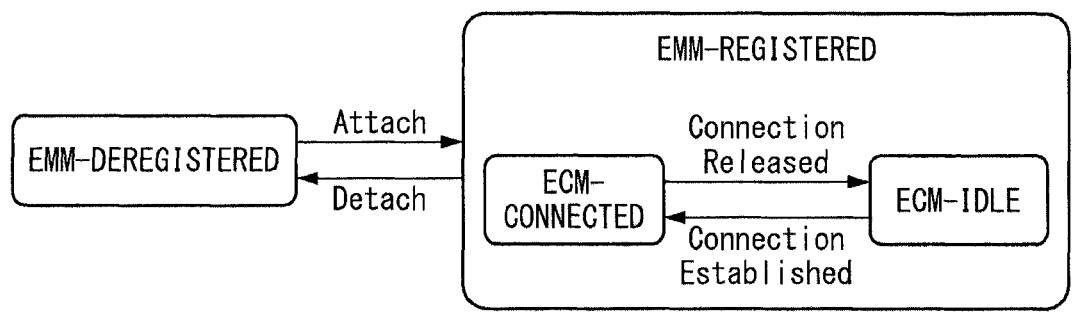
FIG. 6 is a diagram illustrating EMM and ECM states in a wireless communication system to which the present invention may apply.

FIG. 6 illustrates an EMM and ECM states in a wireless communication system to which the present invention may apply.

With reference to FIG. 6, to manage mobility of the UE in the NAS layer defined in the control planes of the UE and the MME, EMM-REGISTERED and EMM-DEREGISTERED states may be defined depending on whether the UE is attached to or detached from a network. The EMM-REGISTERED and the EMM-DEREGISTERED states may be applied to the UE and the MME.

Initially, the UE stays in the EMM-DEREGISTERED state when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Likewise, to manage signaling connection between the UE and the network, ECM-CONNECTED and ECM-IDLE states may be defined. The ECM-CONNECTED and ECM-IDLE states may also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, if RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network may identify the UE staying in the ECM-CONNECTED state at the level of cell unit and may control the UE in an effective manner.

Meanwhile, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE may receive a broadcast of system information and paging information by monitoring a paging signal at a specific paging occasion for each piece of UE-specific paging DRX cycle.

When the UE is in the ECM-IDLE state, the network does not carry context information of the UE. Therefore, the UE staying in the ECM-IDLE state may perform a mobility-related procedure based on the UE, such as cell selection or cell reselection, without necessarily following an order of the network. If the position of the UE differs from the position recognized by the network while the UE is in the ECM-IDLE state, the UE may inform the network of the corresponding position of the UE through a Tracking Area Update (TAU) procedure.

Meanwhile, when the UE is in the ECM-CONNECTED state, mobility of the UE is managed by an order of the network. While the UE stays in the ECM-CONNECTED state, the network knows to which cell the UE currently belongs. Therefore, the network may transmit and/or receiver data to or from the UE, control mobility of the UE, such as handover, and perform cell measurement with respect to neighboring cells.

As described above, the UE has to make a transition to the ECM-CONNECTED state in order to receive a general mobile communication service, such as a voice or data communication service. When the UE is first powered on, the UE in its initial state stays in the ECM-IDLE state as in the EMM state, and if the UE successfully registers to the corresponding network through an initial attach procedure, the UE and the MME make a transition to the ECM connection state. Furthermore, if UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

Figure 7:
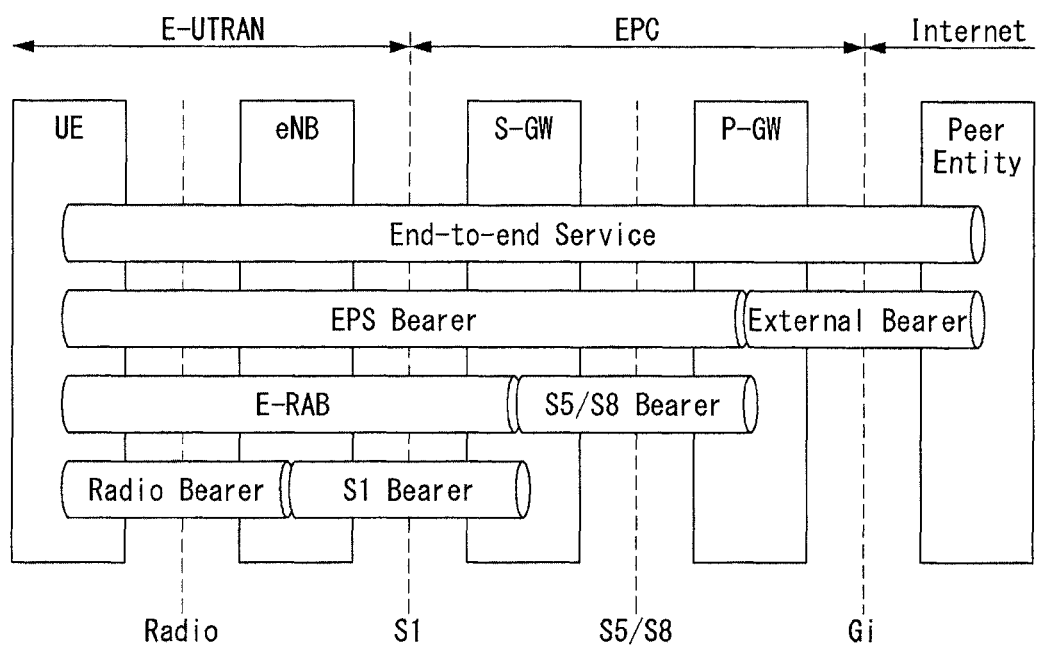
FIG. 7 is a diagram illustrating a bearer structure in a wireless communication system to which the present invention may apply.

FIG. 7 illustrates a bearer structure in a wireless communication system to which the present invention may apply.

When a UE is connected to a Packet Data Network (PDN) (which is the peer entity of FIG. 7), a PDN connection is established, which may also be called an EPS session. The PDN provides a service function such as the Internet or IP Multimedia Subsystem (IMS) through an external or internal IP network of a service provider.

An EPS session comprises one or more EPS bearers. The EPS bearer refers to the transmission path of traffic generated between the UE and the PDN GW for the EPS to deliver user traffic. One or more EPS bearers may be set up for each UE.

Each EPS bearer may be classified into E-UTRAN Radio Access Bearer (E-RAB) or S5/S8 bearer, and the E-RAB may be further divided into a Radio Bearer (RB) and S1 bearer. In other words, one EPS bearer corresponds to one RB, one S1 bearer, and one S5/S8 bearer.

The E-RAB delivers packets of the EPS bearer between the UE and the EPC. When an E-RAB is existed, the E-RAB bearer is one-to-one mapped to the EPS bearer. A Data Radio Bearer (DRB) delivers packets of the EPS bearer between the UE and the eNB. When a DRB is existed, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is an IP flow or a group of IP flows obtained by classifying (or filtering) user traffic according to an individual service. A plurality of SDFs may be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs may be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer may be one of two types: a default bearer and a dedicated bearer. The UE may have one default bearer and one or more dedicated bearers for each PDN. The minimum basic bearer that the EPS session may have with respect to one PDN is called the default bearer.

The EPS bearer may be classified on the basis of its identity. The EPS bearer identity is allocated by the UE or the MME. The dedicated bearer(s) is combined with the default bearer by a Linked EPS Bearer Identity (LBI).

When the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And when new traffic is generated in the corresponding PDN, the E-RAB bearer s reconfigured to deliver traffic.

When the UE attempts to use a service of which the Quality of Service (QoS) (e.g., Video on Demand (VoD) service, etc.) may not be supported by the default bearer while using a service (e.g., the Internet) through the default bearer, a dedicated bearer is created when the UE demands the high QoS service. In the case there is no traffic from the UE, the dedicated bearer is released. The UE or the network may create a plurality of dedicated bearers depending on needs.

Depending on which service the UE uses, the IP flow may have different QoS characteristics. When the EPS session for the UE is established or modified, the network allocates network resources; or determines a control policy about QoS and applies the policy while the EPS session is maintained. The aforementioned operation is called the Policy and Charging Control (PCC). The PCC rule is determined based on the operator's policy (e.g., a QoS policy, gate status, charging method, etc.).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or needs to be rejected in case of resource limitations. Also, the ARP can be used by the eNB to determine which bearer(s) to drop during periods of exceptional limited resources (e.g., handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and the ARP. The AMBR indicates that instead of allocating resources to individual bearers, maximum bandwidth is allocated, where other non-GBR type bearers can be used together.

Once the QoS of the EPS bearer is determined, the QoS of each bearer is determined for each interface. Since the bearer of each interface provides QoS of the EPS bearer according to the interface, the EPS bearer, RB, and S1 bearer all have a one-to-one relationship among them.

When the UE, while using a service through the default bearer, uses a service that the default bearer alone is not enough to provide sufficient QoS, a dedicated bearer is generated on-demand.

FIG. 8 illustrates transmission paths of a control plane and a user plane in an EMM registration state in a wireless communication system to which the present invention may apply.

(a) of FIG. 8 illustrates ECM-CONNECTED state, and (b) of FIG. 8 illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in (a) of FIG. 8, in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, the DRB, S1 bearer, and S5 bearer are all set up (that is, radio or network resources are allocated).

As shown in (b) of FIG. 8, in the ECM-IDLE state where there is no user traffic, the ECM connection (that is, RRC connection and S1 signaling connection) is released. However, the S11 GTP-C connection between the MME and the SGW and the S5 GTP-C connection between the SGW and the PDN GW are retained.

Also, in the ECM-IDLE state, the DRB and the S1 bearer are all released, but the S5 bearer is retained (that is, radio or network resources are allocated).

Figure 9:
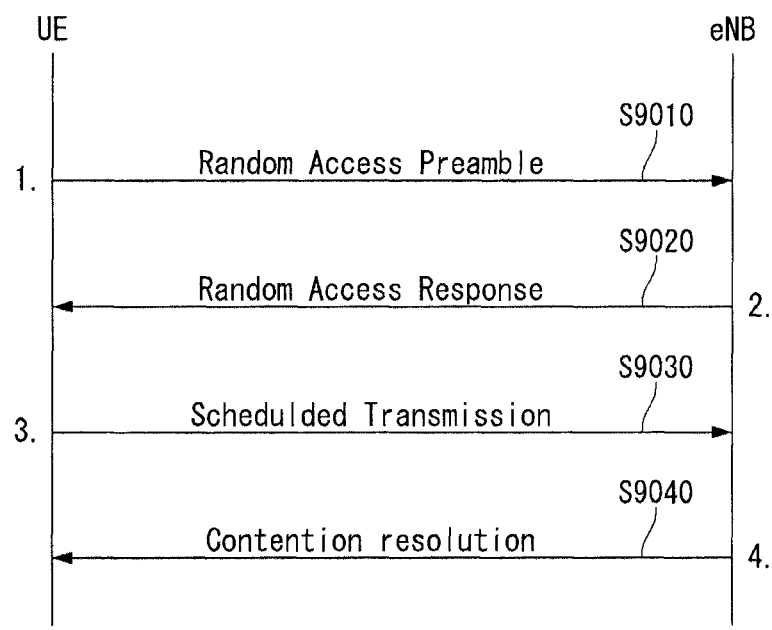
FIG. 9 is a diagram illustrating operational processes for a UE and an eNB in a contention-based random access procedure.

FIG. 9 is a diagram illustrating operational processes for a UE and an eNB in a contention-based random access procedure.

(1) Transmission of First Message

A UE may randomly select a random access preamble from a set of random access preambles indicated through system information or a Handover Command, select a Physical RACH (PRACH) resource capable of carrying the random access preamble, and transmit the random access preamble in the PRACH resource (S9010).

(2) Reception of Second Message

A method of receiving random access response information is similar to the above-described non-contention based random access procedure. That is, after transmitting the random access preamble in the step S9010, the UE attempts to receive a random access response thereof within a random access response reception window indicated through the system information or Handover Command by an eNB, and receives a PDSCH using corresponding RA-RNTI information (S9020). Through this, the UE may receive a UL grant, a temporary cell identifier (temporary C-RNTI), a time synchronization correction value (timing advance command: TAC) and the like.

(3) Transmission of Third Message

Upon receipt of a valid random access response, the UE processes information included in the random access response. That is, the UE applies the TAC and stores the temporary C-RNTI. In addition, the UE transmits data (i.e. a third message) to the eNB using the UL grant (S9030). The third message should include an ID of the UE. This is because the eNB cannot determine which UEs perform the random access procedure in the contention-based random access procedure and the UEs need to be identified for contention resolution.

Two methods have been discussed to include a UE identifier in the third message. According to a first method, if the UE has a valid cell identifier already allocated by a corresponding cell before the random access procedure, the UE transmits its own cell identifier by a UL transmission signal corresponding to the UL grant. On the other hand, if a valid cell identifier has not been allocated to the UE before the random access procedure, the UE transmits its unique identifier (e.g., an S-TMSI or a Random ID) in the third message. In general, the unique identifier is longer than a cell identifier. Once the UE has transmitted data corresponding to the UL grant, the UE starts a contention resolution timer.

(4) Reception of Fourth Message

After the UE transmits data including its own identifier through the UL grant that is included in the random access response, the UE awaits an indication from the eNB for contention resolution. That is, the UE may attempt to receive a PDCCH in order to receive a specific message (S9040). The UE may receive the PDCCH using two methods. In the case in which the UE has transmitted the third message in response to the UL grant using a cell identifier as its own identifier, the UE may attempt to receive a PDCCH using its own cell identifier. In the case in which the UE has transmitted the third message in response to the UL grant using an identifier specific to the UE as its own identifier, the UE may attempt to receive a PDCCH using a temporary C-RNTI included in the random access response. In the former case, when the UE has received a PDCCH through its own cell identifier before the contention resolution timer expires, the UE may determine that the random access procedure has been properly performed and then terminate the random access procedure. In the latter case, when the UE has received a PDCCH through a temporary C-RNTI before the contention resolution timer expires, the UE checks data carried in a PDSCH indicated by the PDCCH. If the UE-specific identifier is included in the data, the UE may determine that the random access procedure has been properly performed and then terminate the random access procedure.

Hereinafter, an RRC state of a UE and an RRC connection mechanism will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled.

On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

An NAS (Non-Access Stratum) layer located in an upper RRC layer performs session management and mobility management.

In order to manage the mobility of the UE, two states of EMM-REGISTERED (EPS Mobility Management-REGISTERED) and EMM-DEREGISTERED are defined, and the two states apply to the UE and the MME. Initially, the UE is in the EMM-DEREGISTERED state, and in order for the UE to connect to the network, a process of registering to a corresponding network is performed through an initial attach procedure. When the attach procedure is successfully performed, the UE and the MME are in the EMM-REGISTERED state.

To manage a signaling connection between the UE and the EPC, two states of an ECM (EPS Connection Management)-IDLE state and an ECM-CONNECTED state are defined, and the two states are applied to the UE and the MME. When a UE in the ECM-IDLE establishes an RRC connection with the E-UTRAN, the corresponding UE is in the ECM-CONNECTED state.

When the MME in the ECM-IDLE state establishes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE-based, mobility-related procedure such as cell selection or cell reselection without having to receive a command from the network. On the other hand, when the UE is in the ECM-CONNECTED state, the mobility of the UE is managed by a command from the network. When the location of the UE in the ECM-IDLE state is different from a location known to the network, the UE notifies the network of the UE's location through a tracking area update procedure.

Next, system information is described.

The system information includes essential information which must be known in order for a UE to connect to a base station. Therefore, the UE must receive all the system information before the UE is connected to the base station, and also the UE needs to have the latest system information. Since the system information is the information which must be known to all UEs within a cell, the base station periodically transmits the system information.

According to Section 5.2.2 of 3GPP TS 36.331 V8.7.0 (2009-09) "Radio Resource Control (RRC); Protocol specification (Release 8)," the system information is divided into MIB (Master Information Block), SB (Scheduling Block), and SIB (System Information Block). The MIB enables the UE to be aware of a physical configuration of a corresponding cell, for example, a bandwidth. The SB informs transmission information of the SIBs, for example, a transmission period. The SIB is a collection of system information that are related to one another. For example, a certain SIB includes information only about a surrounding cell and a certain SIB includes information only about an uplink radio channel used by the UE.

Generally, a service provided by the network to the UE can be divided into three types as below. In addition, the UE recognizes a cell type depending on which service is available. A service type is first described below and the cell type is described later.

1) Limited service: This service provides an emergency call and a disaster warning system (Earthquake and Tsunami Warning System; ETWS) and may be provided in an acceptable cell.

2) Normal service: This service means a public-use service for a general purpose and may be provided in a suitable or normal cell.

3) Operator service: This service means a service for a communication network operator, and this cell can be used only by the network operator, not by a general user.

Regarding the service type provided by the cell, the cell type may be classified as follows.

1) Acceptable cell: a cell in which the UE may be provided with a limited service. The cell is not barred and satisfies a cell's selection criteria.

2) Suitable cell: a cell in which the UE may be provided with a regular service. This cell satisfies a condition for the acceptable cell while satisfying additional conditions at the same time. The additional conditions are that this cell must belong to a PLMN (Public Land Mobile Network) to which a corresponding UE can connect and must be a cell in which the tracking area update procedure of the UE is not prohibited. If the corresponding cell is a CSG cell, this cell must be a cell to which the UE can connect to as a CSG member.

3) Barred cell: a cell which broadcasts information that the cell is barred through the system information.

4) Reserved cell: a cell which broadcasts information that the cell is reserved through the system information.

Figure 10:
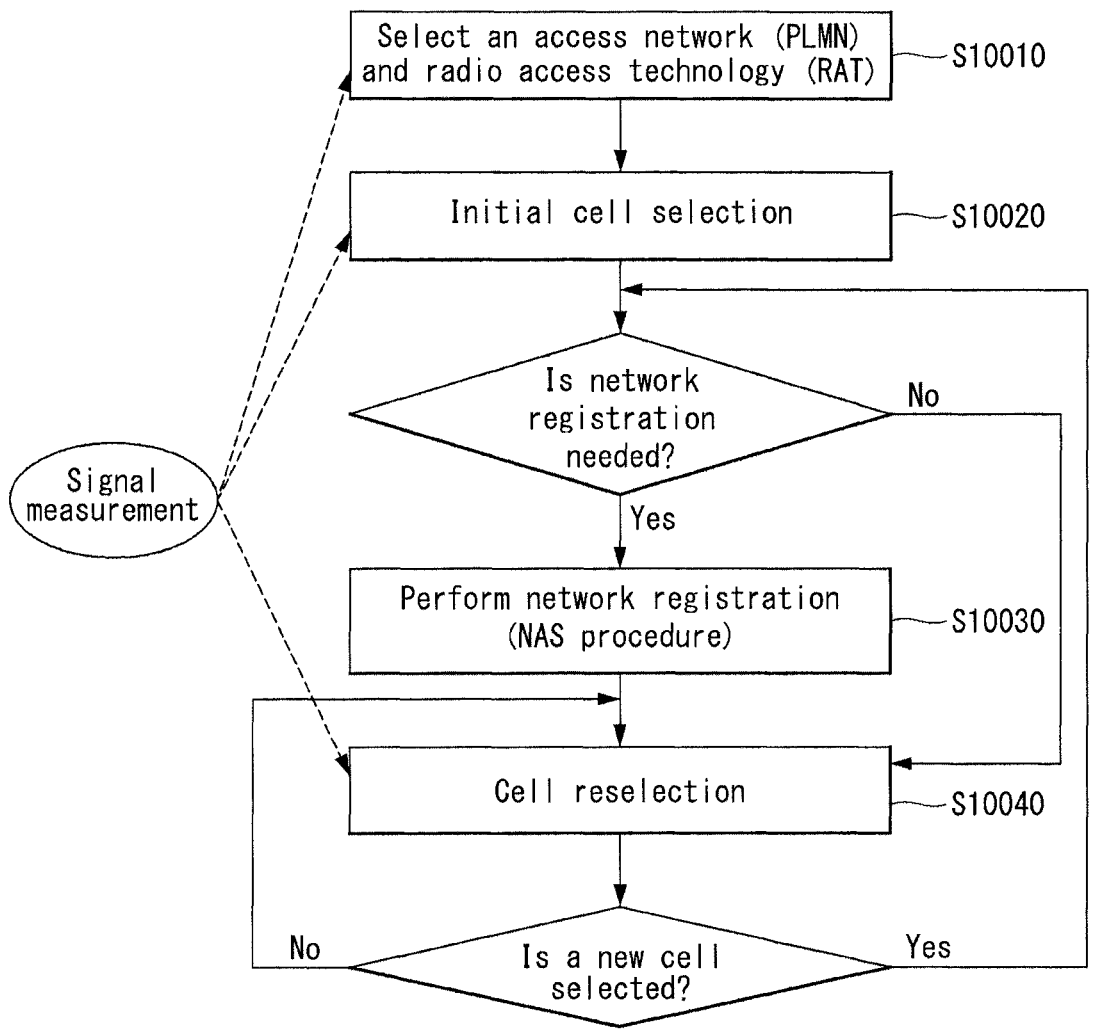
FIG. 10 is a flowchart showing an operation of a UE in an RRC idle state to which the present invention may apply.

FIG. 10 is a flowchart showing an operation of a UE in an RRC idle state to which the present invention may apply.

FIG. 10 shows a procedure in which a UE is registered to a network through a cell selection process when the UE is initially powered on and a cell reselection is performed when necessary.

Referring to FIG. 10, the UE selects a Radio Access Technology (hereinafter, referred to as "RAT") for communicating with a Public Land Mobile Network (hereinafter, referred to as "PLMN") from which the UE itself desires to receive a service (S10010). The information about PLMN and RAT may be selected by the user of the UE, and what is stored in the USIM (universal subscriber identity module) may be also used.

The UE selects a cell having the largest value among the cells that the measured base station has a value greater than a particular value in the signal intensity and quality (cell selection) (S10020). Then, it receives SI being sent by the base station. The particular value denotes a value defined by a system to guarantee the quality of physical signals in the data transmission and/or reception. Accordingly, the value may vary based on the RAT to be applied.

The UE registers its own information (for example, IMSI) for receiving a service (for example, paging) from a network (S10030). Here, the UE is not registered into a network to be accessed whenever selecting a cell but registered into a network in case when network information received from SI (for example, Tracking Area Identity (TAI)) is different from network information that the UE itself knows.

The UE performs cell re-selection based on a service environment provided in a cell, a terminal environment, or the like (S10040). If a value of the signal intensity and quality measured by the base station from which the UE receives a service is less than a value measured by the base station of the neighboring cell, then the UE selects one of the other cells providing signals having better characteristics than those of the cell of the base station being accessed by the UE. This process is called a cell reselection to distinguish it from an initial cell selection in the second step. At this time, a time restriction condition may be specified in order to prevent a cell from being frequently reselected based on the change of the signal characteristics.

Figure 11:
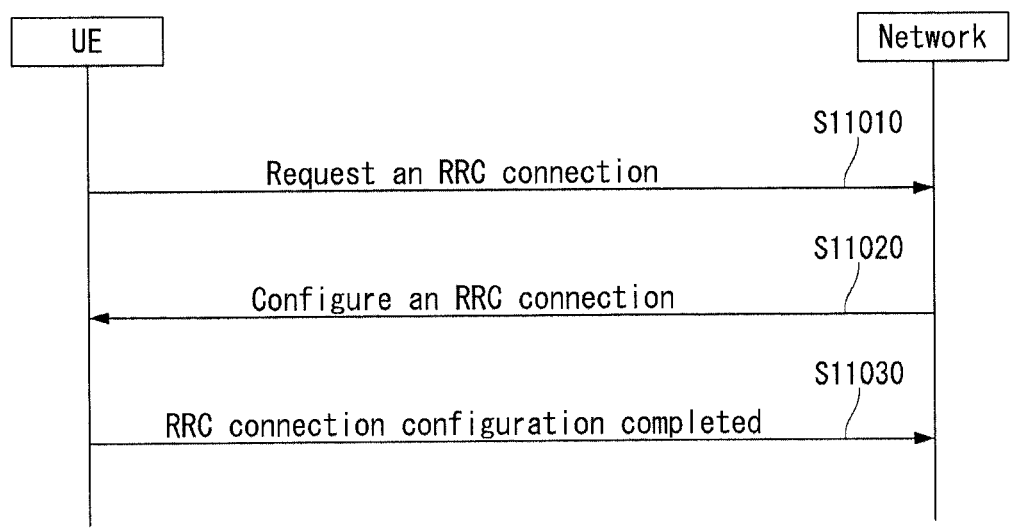
FIG. 11 is a flowchart showing an RRC connection establishment procedure to which the present invention may apply.

FIG. 11 is a flowchart showing an RRC connection establishment procedure to which the present invention may apply.

A UE sends to a network an RRC connection request message for requesting an RRC connection (S11010). The network sends an RRC connection setup message in response to the RRC connection request (S11020). After receiving the RRC connection setup message, the UE enters an RRC connection mode.

The UE sends to the network an RRC connection setup complete message used to confirm successful completion of the RRC connection establishment (S11030).

Figure 12:
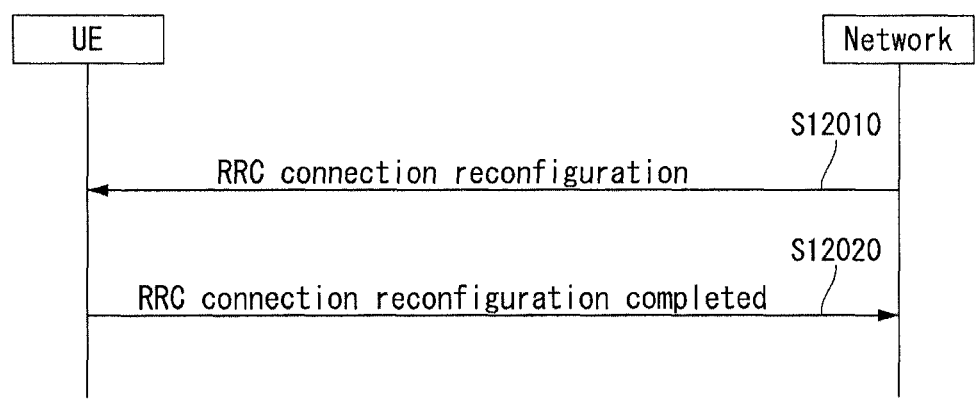
FIG. 12 is a flowchart showing an RRC connection reconfiguration procedure to which the present invention may apply.

FIG. 12 is a flowchart showing an RRC connection reconfiguration procedure to which the present invention may apply.

An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (S12010). In response to the RRC connection reconfiguration, the UE sends to the network an RRC connection reconfiguration complete message used to confirm successful completion of the RRC connection reconfiguration (S12020).

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a cell of a proper quality. For example, a terminal where power is turned-on just before should select a cell of a proper quality to registered in a network. If the terminal in an RRC connection state enters in an RRC idle state, the terminal should select a cell for stay in the RRC idle state. In this way, a procedure of selecting a cell satisfying a certain condition by the terminal in order to be in a service idle state such as the RRC idle state refers to cell selection. Since the cell selection is performed when a cell in the RRC idle state has not been selected, it is important to select the cell as soon as possible.

Accordingly, as long as the cell provides more than a certain level of radio signal quality, the cell may be selected during a cell selection procedure of the terminal, even if the cell does not provide the best radio signal quality.

A method and procedure of selecting a cell by a terminal in a 3GPP LTE is described with reference to 3GPP TS 36.304 V8.5.0 (2009-03) "User Equipment (UE) procedures in idle mode (Release 8)".

A cell selection is largely divided into two processes.

The first process is an initial cell selection process. In this process, UE does not have preliminary information about a wireless channel. Accordingly, the UE searches all wireless channels to find a suitable cell. The UE searches for the strongest cell in each channel. Thereafter, once the UE finds a suitable cell that satisfies cell selection criteria, the UE selects the corresponding cell.

Next, the UE may select the cell using stored information or using information broadcasted by the cell. Accordingly, cell selection may be quickly done compared to an initial cell selection process. As long as the UE finds a cell that satisfies the cell selection criterion, the UE selects the corresponding cell. If any suitable cell that satisfies the cell selection criterion is not found though such a process, the UE performs an initial cell selection process.

After the UE selects a certain cell through a cell selection process, the signal strength and quality between the UE and the base station may be changed due to the change of the UE mobility and wireless environment. Therefore, if the quality of the selected cell is deteriorated, the UE may select another cell providing better quality. If a cell is reselected in this manner, this cell, in general, should be a cell that provides better signal quality than the currently selected cell.

This process is called a cell reselection. In terms of radio signal quality, in general, a basic purpose of the cell reselection process is to select a cell providing best quality to the UE.

Apart from radio signal quality, the network may determine the priority for each frequency and notify the UE about this. Upon receiving the priority, the UE may take this priority into consideration more than the radio signal quality criterion during the cell reselection process.

As described above, there is a method of selecting or reselecting a cell based on the signal property of the wireless environment. When a cell is selected for reselection in the cell reselection process, the following cell reselection methods may be used, based on the RAT and frequency characteristics of the cell.

Intra-frequency cell reselection: A reselected cell is a cell having the same RAT and same center-frequency as a cell on which the UE is currently camping.

Inter-frequency cell reselection: A reselected cell is a cell having the same RAT as a cell on which the UE is currently camping but has a different center-frequency than it.

Inter-RAT cell reselection: A reselected cell is a cell using a RAT different from the RAT of a cell on which the UE is currently camping.

The principles of the cell reselection process are as follows.

First, the UE measures the qualities of a serving cell and a neighboring cell for the cell reselection.

Second, the reselection is performed based on the cell reselection criterion. The cell reselection criterion has the following features in relation to the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called the best ranked cell. The cell index value is basically a value obtained by the UE measures on the corresponding cell, to which a frequency offset or cell offset is used as necessary.

The inter-frequency cell reselection is based on a frequency priority provided by the network. The UE attempts to camp on a frequency having the highest frequency priority. The network may provide the frequency priority common for in-cell UEs through broadcast signaling or provide a frequency-specific priority for each UE through UE-dedicated signaling. The cell reselection priority provided through broadcast signaling may be called a common priority, and the cell reselection priority set for each UE by the network may be called a dedicated priority. If the UE receives the dedicated priority, the UE may receive the relevant validity time along with the dedicated priority. Upon receiving the dedicated priority, the UE starts the validity timer which is set to the received validity time. The UE applies the dedicated priority in the RRC idle mode while the validity timer is operating. When the validity timer expires, the UE discards the dedicated priority and applies the common priority again.

For the inter-frequency cell reselection, the network may provide the UE with a parameter (e.g., a frequency-specific offset) used in cell reselection for each frequency.

For the intra-frequency cell reselection or the inter-frequency cell reselection, the network may provide the UE with a Neighboring Cell List (NCL) used in cell reselection. The NCL includes a cell-specific parameter (e.g., a cell-specific offset) used in cell reselection.

For the intra-frequency or inter-frequency cell reselection, the network may provide the UE with a cell reselection black list used in cell reselection. The UE does not perform cell reselection on a cell included in the black list.

Hereinafter, RLM (Radio Link Monitoring) is described.

A UE monitors downlink quality based on a cell-specific reference signal in order to detect downlink radio link quality of a PCell.

The UE estimates downlink radio link quality for the purpose of monitoring the downlink radio link quality of the PCell and compares the estimated quality with thresholds Qout and Qin. The threshold Qout is defined as a level that does not allow for stable reception via a downlink radio link, and this corresponds to a 10% block error rate of hypothetical PDCCH transmission considering PDFICH errors. The threshold Qin is defined as a downlink radio link quality level that allows for more stable reception than the threshold Qout, and this corresponds to a 2% block error rate of hypothetical PDCCH transmission, with PCFICH errors taken into account.

Hereinafter, a radio link failure (RLF) is described.

Figure 13:
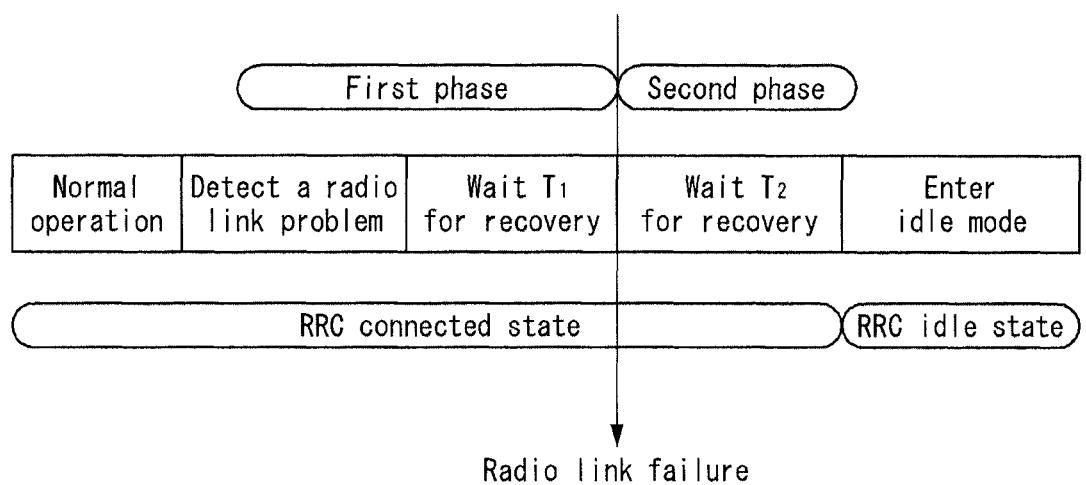
FIGS. 13 and 14 illustrate a radio link failure and a recovering method to which the present invention may be applied.
Figure 14:
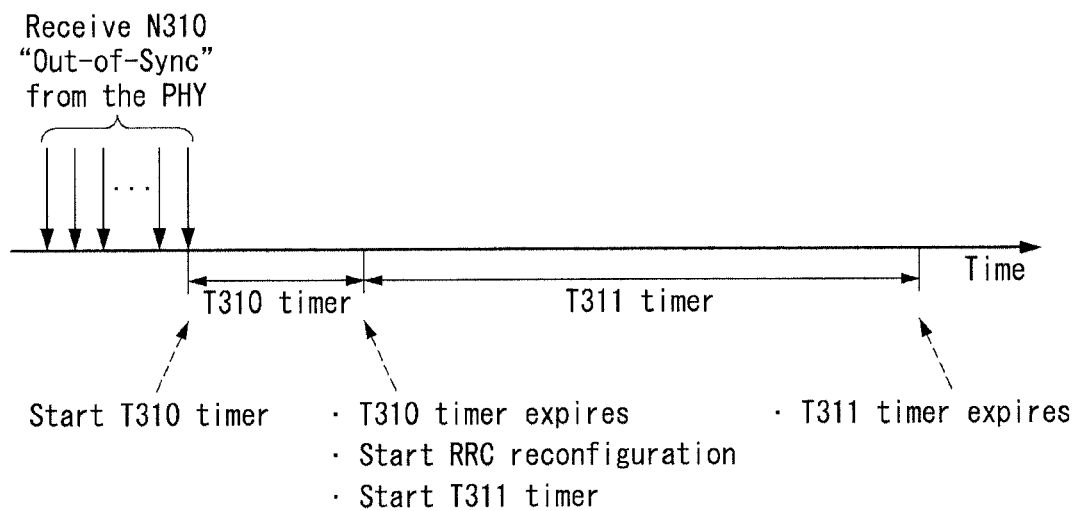

FIGS. 13 and 14 illustrate a radio link failure and a recovering method to which the present invention may be applied.

A UE continuously performs measurement to maintain quality of a radio link to a serving cell from which the UE receives a service. The UE determines whether communication is impossible in the current situation due to deterioration of quality of a radio link to the serving cell.

If quality of a serving cell is too low to perform communication, the UE determines the current situation as a radio link failure.

If a radio link failure is determined, the UE gives up maintaining communication with a current serving cell, selects a new cell through a cell selection (or cell reselection) procedure, and attempts RRC connection reestablishment to the new cell.

More specifically, referring to FIGS. 13 and 14, the operation related to a radio link failure may be divided into two phases.

In a first phase, the UE is in a normal operation and checks whether there is a problem in a radio link of a current serving eNB. At this time, the UE may determine that an RLF has occurred if the following problems are observed in the corresponding radio link.

(1) First, it is determined that an RLF has occurred due to a physical channel problem.

The UE may determine that out-of-sync has occurred in a physical channel if quality of a Reference Signal (RS) received periodically from an eNB is detected to be below a threshold in the physical channel. If the out-of-sync occurs continuously by a specific number of times (for example, N310) as shown in FIG. 14, this occurrence is notified to the RRC. The RRC which receives the out-of-sync message from the physical channel runs a timer T310 and waits for the problem of the physical channel to be solved while the timer T310 is running. If receiving a message indicating that consecutive in-syncs have occurred by a specific number of times (for example, N311) from the physical channel while the timer T310 is running, the RRC determines that the problem in the physical channel has been solved and stops the running timer T310. However, if not receiving an in-sync message until the timer T310 is completed, the RRC determines that an RLF has occurred.

(2) The UE may determine that an RLF has occurred due to a MAC random access problem.

When a UE performs a random access process in the MAC layer, the UE goes through the steps of random access resource selection, random access preamble transmission, random access response reception, and contention resolution sequentially. The whole process is called a one-time random access process; when the process is not successfully completed, the UE waits for a period of time equal to back-off time and performs the next random access process. If the random access process is still not successful after a predetermined number of attempts (for example, preambleTransMax), the UE notifies the RRC of the current situation, and the RRC determines that an RLF has occurred.

(3) The UE may determine that an RLF has occurred due to an RLC maximum retransmission problem.

If the RLC layer uses Acknowledges Mode (AM) RLC, the UE retransmits an RLC PDU which has failed for transmission.

However, if transmission is not successful even though the AM RLC attempts retransmission by a predetermined number of times (for example, maxRetxThreshold) with respect to a specific AMD PDU, the UE notifies the RRC of the current situation, and the RRC determines that an RLF has occurred.

If such a problem occurs, the UE declares a radio link problem and waits for the radio link to be recovered within a time period equal to a first waiting time T1. If the radio link is recovered before the first waiting time is passed, the UE resumes the normal operation. If the radio link is not recovered until the first waiting time expires, the UE declares a Radio Link Failure (RLF) and enters a second phase.

In the second phase, the UE again waits for the radio link to be recovered within a second waiting time T2. If the radio link is not recovered until the second waiting time expires, the UE enters the idle state. Also, the UE may perform the RRC connection re-establishment procedure.

The RRC determines the occurrence of the RLF from the three causes described above. If an RLF occurs from any of the three causes, the UE performs RRC connection re-establishment which is a procedure for re-establishing an RRC connection to the eNB.

The RRC connection re-establishment procedure, which is performed at the occurrence of an RLF, is performed as follows.

If the UE determines that a serious problem has occurred in the RRC connection itself, the UE performs the RRC connection re-establishment procedure to re-establish a connection to the eNB. The serious problem related to an RRC connection may be divided into the following five cases: (1) radio link failure, (2) handover failure, (3) mobility from E-UTRA, (4) PDCP integrity check failure, and (5) RRC connection reconfiguration failure.

If any of the problems occurs, the UE runs a timer T311 and starts the RRC connection re-establishment process. During the process, the UE connects to a new cell through those procedures including a cell selection and a random access procedure.

If the UE finds an appropriate cell through a cell selection procedure while the timer T311 is running, the UE stops the timer T311 and starts a random access procedure to the corresponding cell. However, if the UE fails to find an appropriate cell until the timer T311 is completed, the UE determines an RRC connection failure and enters the RRC_IDLE mode.

In what follows, the RRC connection re-establishment procedure will be described in more detail.

Figure 15:
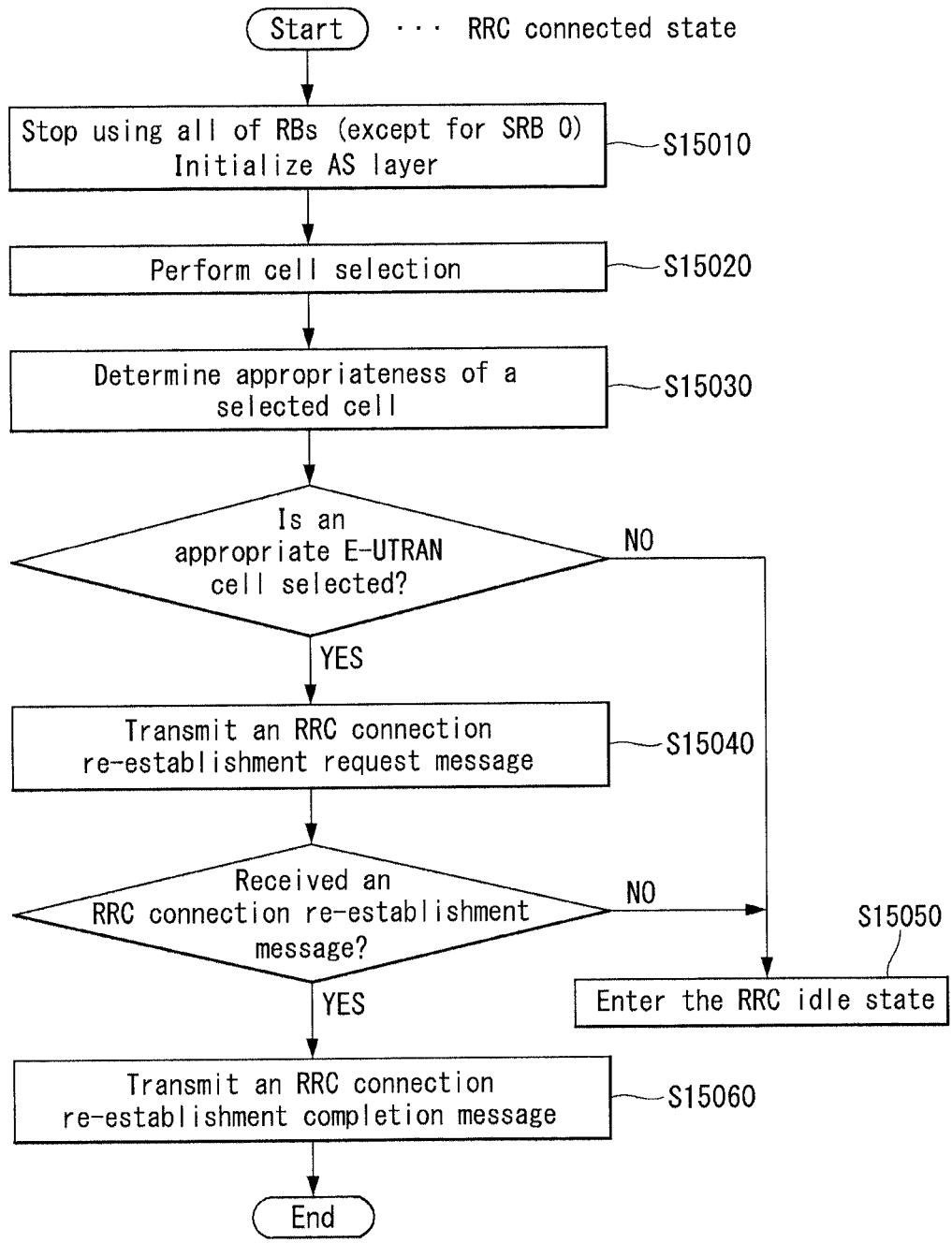
FIG. 15 illustrates one example of a procedure for re-establishing an RRC connection to which the present invention may be applied.

FIG. 15 illustrates one example of a procedure for re-establishing an RRC connection to which the present invention may be applied.

Referring to FIG. 15, the UE stops using all of radio bearers except for Signaling Radio Bearer (SRB) 0 and initializes various types of sub-layers of the Access Stratum (AS) S15010. Also, the UE sets each sub-layer and physical layer to their default configuration. During the process, the UE stays in the RRC connected state.

The UE performs a cell selection procedure for conducting an RRC connection reestablishment procedure (S15020). Although the UE maintains the RRC connection state during the RRC connection reestablishment procedure, the cell selection procedure may be performed in the same way as the cell selection procedure performed by the UE in the RRC idle mode.

After performing the cell selection procedure, the UE identifies the system information on a corresponding cell to determine whether the corresponding cell is a proper cell (S15030). If the selected cell is determined to be a proper E-UTRAN cell, the UE sends an RRC connection reestablishment request message to the corresponding cell (S15040).

On the other hand, if the cell selected through the cell selection procedure for performing the RRC connection reestablishment procedure is determined to be a cell using an RAT other than the E-UTRAN, the UE stops the RRC connection reestablishment procedure and enters the RRC idle state (S15050).

The UE may be implemented to complete checking whether the cell is proper within a limited time through the cell selection procedure and reception of the system information on the selected cell. To this end, the UE may run a timer as the UE initiates the RRC connection reestablishment procedure. If it is determined that the UE has selected a proper cell, the timer may be stopped. When the timer expires, the UE considers it a failure of the RRC connection reestablishment procedure and may enter the RRC idle mode. This timer is hereinafter referred to as a radio link failure timer. According to the LTE spec. TS 36.331, a timer named T311 may be used as the radio link failure timer. The UE may obtain set values for the timer from the system information of the serving cell.

Upon receiving the RRC connection reestablishment request message from the UE and accepting the request, the cell transmits an RRC connection reestablishment message to the UE.

Upon receiving the RRC connection reestablishment message from the cell, the UE reconfigures a PDCP sub-layer and an RLC sub-layer for SRB1. Further, the UE recalculates various key values relating to security configuration and reconfigures the PDCP sub-layer that is in charge of security with the newly calculated security key values.

By doing so, SRB 1 between the UE and the cell is opened, and RRC control messages may be communicated therebetween. The UE completes resuming SRB1 and sends to the cell an RRC connection reestablishment complete message indicating that the RRC connection reestablishment procedure is complete (S13060).

On the contrary, unless the cell receives the RRC connection reestablishment request message from the UE and accepts the request, the cell transmits an RRC connection reestablishment reject message to the UE.

Once the RRC connection reestablishment procedure is successfully done, the cell and the UE perform an RRC connection reestablishment procedure. By doing so, the UE restores to the state as it was before performing the RRC connection reestablishment procedure and guarantees maximum service continuity.

Next, RLF reporting is now described.

The UE, if an RLF or handover failure occurs, reports such a failure event to the network in order to support MRO (Mobility Robustness Optimisation) of the network.

After the RRC connection reestablishment, the UE may provide an RLF report to the eNB. The radio measurements contained in the RLF Report may be used to identify coverage issues as the potential cause of the failure. This information may be used to exclude those events from the MRO evaluation of intra-LTE mobility connection failures and redirect them as input to other algorithms.

In case the RRC re-establishment fails or the UE does not perform any RRC re-establishment, the UE may make the RLF Report available to the eNB after reconnecting from idle mode. For this purpose, The UE stores the latest RLF or handover failure related information, and indicates RLF report availability at each subsequent LTE RRC connection (re-)establishment and handover to an LTE cell until the RLF report is fetched by the network or for 48 hours after the RLF or handover failure is detected.

The UE keeps the information during state transitions and RAT changes, and indicates RLF report availability again after it returns to the LTE RAT.

Availability of the RLF Report at the RRC connection setup procedure is the indication that the UE suffered from a connection failure and that the RLF Report from this failure was not yet delivered to the network. The RLF Report from the UE includes the following information:

- The E-CGI of the last cell that served the UE (in case of RLF) or the target of the handover (in case of handover failure). If the E-CGI is not known, the PCI and frequency information are used instead.
- E-CGI of the cell that the re-establishment attempt was made at.
- E-CGI of the cell that served the UE at the last handover initialization, i.e. when message 7 (RRC Connection Reconfiguration) was received by the UE.
- Time elapsed since the last handover initialization until connection failure.
- An indication whether the connection failure was due to RLF or handover failure.
- The radio measurements.
- Location of failure The eNB receiving the RLF Report from the UE may forward the report to the eNB that served the UE before the reported connection failure. The radio measurements contained in the RLF Report may be used to identify coverage issues as the potential cause of the failure. This information may be used to exclude those events from the MRO evaluation of intra-LTE mobility connection failures and redirect them as input to other algorithms.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like. Measurement for such a purpose is generally called radio resource management (RRM) measurement.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identity (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band.

Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement.

The UE performs the intra-frequency measurement and reports a measurement result to the network at a proper time, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network at an appropriate time.

When the UE supports measurement on a heterogeneous network based on different RATs, measurement on a cell of the heterogeneous network may be performed according to a configuration of a base station. Such a measurement is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 16:
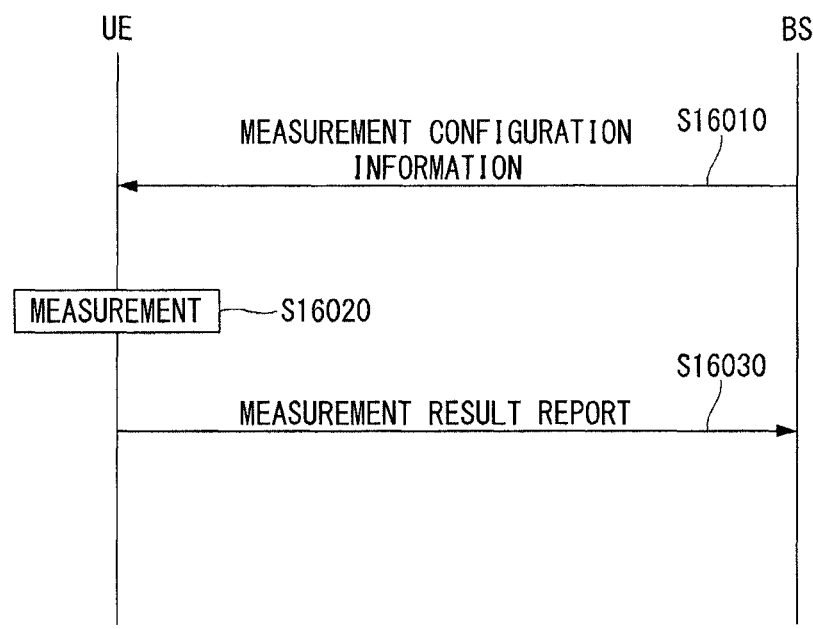
FIG. 16 is a flow diagram illustrating one example of a method for performing measurement to which the present invention may be applied.

FIG. 16 is a flow diagram illustrating one example of a method for performing measurement to which the present invention may be applied.

The UE receives measurement configuration information from the eNB S16010. A message including measurement configuration information is called a measurement configuration message. The UE performs measurement on the basis of the measurement configuration information S16020. If a measurement result satisfies a reporting condition within the measurement configuration condition, the UE reports the measurement result to the eNB S16030. A message including a measurement result is called a measurement report message.

Measurement configuration information may include the following information.

(1) Measurement object information: information about an object for which a UE performs measurement. A measurement object includes any one of an intra-frequency measurement object which is an object of intra-cell measurement, inter-frequency measurement object which is an object of inter-cell measurement, and inter-RAT measurement object which is an object of inter-RAT measurement. For example, an intra-frequency measurement object may indicate a neighbor cell having the same frequency band as a serving cell, an inter-frequency measurement object may indicate a neighbor cell having a different frequency band from a serving cell, and an inter-RAT measurement object may indicate a neighbor cell employing a RAT different from the RAT of a serving cell.

(2) Reporting configuration information: information about a reporting condition specifying when a UE reports transmission of a measurement result and a reporting type. Report configuration information may be composed of a list of reporting configurations. Each reporting configuration may include a reporting criterion and reporting format. A reporting criterion refers to a criterion by which transmission of a measurement result by a UE is triggered. A reporting criterion may be a period of measurement report or a single event for measurement report. A reporting format is information describing in which type a UE packages a measurement result.

(3) Measurement identity information: information about measurement identity which associates a measurement object with a reporting configuration and makes a UE to determine when and in which type and which measurement object to report. Being included in a measurement report message, measurement identity information may indicate to which measurement object a measurement result is related and in which reporting condition a measurement report has occurred.

(4) Quantity configuration information: information about measurement unit, reporting unit and/or parameters for configuring filtering of measurement results.

(5) Measurement gap information: information about a measurement gap which is a period in which a UE may be dedicated only to measurement without consideration to data transmission to and from a serving cell as downlink or uplink transmission is not scheduled.

To perform a measurement procedure, the UE has a measurement object list, measurement configuration list, and measurement identity list.

In the 3GPP LTE system, an eNB may set up only one measurement object for a UE with respect to one frequency band. The clause 5.5.4 of 3GPP TS 36.331 V8.5.0 (2009-03) "Evolved Universal Terrestrial Radio Access (E-UTRA) Radio Resource Control (RRC); Protocol specification (Release 8)" defines events that trigger measurement reporting as shown in Table 1 below.

TABLE 1

| Event | Reporting Condition |
| --- | --- |
| Event A1 | Serving becomes better than threshold |
| Event A2 | Serving becomes worse than threshold |
| Event A3 | Neighbour becomes offset better than Serving |
| Event A4 | Neighbour becomes better than threshold |
| Event A5 | Serving becomes worse than threshold1 and neighbor becomes better than threshold2 |
| Event B1 | Inter RAT neighbour becomes better than threshold |
| Event B2 | Serving becomes worse than threshold1 and inter RAT neighbor becomes better than threshold2 |

If the measurement result of the UE satisfies a condition for an event, the UE transmits a measurement report message to the eNB.

Reliable communication in the mobile communication technology is a prerequisite for a new communication service realized by error-free transmission or service availability to implement mission critical services (MCSs).

A necessity for reliable communication is recognized as one form of Machine-to-Machine (M2M) communication which satisfies a real-time requirement for traffic safety, traffic efficiency, E-health, efficient industrial communication, and so on.

Also, for reliable communication, a reliable connection has to be provided for applications sensitive to the delay, such as traffic safety or special-purpose mission critical Machine-Type Communication (MTC).

Also, a necessity for reliable communication is recognized for the purposes of medical/emergency response, remote control, and sensing.

MCSs are expected to achieve tremendous improvements in terms of the conventional UMTS/LTE, End-to-End latency with respect to the LTE-A/Wi-Fi, ubiquity, security, and availability/reliability.

In other words, commercial wireless technologies (including the 3GPP LTE and LTE-A) proposed so far do not guarantee sufficient performance to provide various MCSs in terms of real-time and reliability requirements.

Also, the metric of reliability may be an 'evaluation criterion for specifying quality of a radio link connection to satisfy a specific service level'.

Also, the metric of service availability may be called Radio Link Availability (RLA); when the Quality of Experience (QoE) of a UE is expressed in terms of link quality, it may be defined as RLA=Pr (RLQ>=QoE).

Here, RLQ represents measured radio link quality, and QoE represents QoE requirements in terms of link quality.

The following services may be considered as use-case scenarios that may be applied for the 5G mobile communication environment with respect to MCSs.

Control of a robot arm remotely to realize industrial automation or transport heavy loads through remote control of Automated Guided Vehicles (AGVs)

Remote control of drones for providing logistics delivery, remote medical service, and other various public services Exchange of information needed among vehicles to provide an automated driving service or error-free delivery of a safety signal informing of a hidden vehicle not detected by vehicle sensors (camera or radar) or forward collision When the quality of a radio link of a serving eNB deteriorates down to the level inappropriate for MCSs, a link to another alternative eNB has to be determined quickly upon degradation of the radio link (serving link) quality of the serving eNB, and the aforementioned services still need to be provided continuously.

Therefore, when degradation of radio link quality of a serving eNB is detected to be inappropriate for receiving MCSs, another alternative link is needed to be activated quickly, through which to configure an MCS bearer.

In this reason, in order to realize reliable communication in the 5G system, a UE needs to exploit all of radio links in the surroundings and make the radio links to maximize the quality thereof depending on the situations, reduction of outage to a radio link providing an MCS has to be considered as an essential element.

Also, in the conventional LTE/LTE-A system, a UE controls an RLF by using a plurality of timers.

As described above, a UE does not recognize an RLF before a specific timer (for example, T310) is completed, and before another timer (for example, T311) is completed, the UE may maintain an RRC connection or transition to the RRC idle state depending on whether the RRC connection re-establishment procedure is successfully performed.

The future 5G mobile communication is expected to have an error rate less than $10^{-6}$ and RLA requirement of less than $10^{-6}$ to support MCSs such as industrial automation, drone remote control, and vehicle autonomous driving.

By fulfilling the requirements, the 5G mobile communication aims to construct a highly reliable system in which a UE does not experience outage of a radio link and always receives MCSs.

However, since the current LTE/LTE-A system has been designed to deal with the recovery from an RLF in a highly conservative manner, a UE encounters a problem in searching for alternative eNBs to which the UE may quickly switch depending on the channel conditions and securing eNBs providing alternative links for switching a connection to the corresponding alternative eNBs.

To solve the problem above, various methods have been proposed, which enable a UE to secure a plurality of eNB links when the UE connects to the network so that the UE may have alternative link eNBs for quick recovery in case a channel condition of a serving eNB link is degraded.

In other words, the conventional method to be described later includes a method by which a UE sets up multiple connections (or multi-links) to a plurality of eNBs when connecting to the network by transmitting an indicator notifying eNBs that the UE is an MCS-capable UE and a method by which a UE switches to an eNB providing an optimal radio link among alternative, secured eNBs when radio link quality of a serving eNB is degraded.

However, the conventional method reveals a problem in a radio link switching process from a radio link of a serving eNB to a radio link of an alternative eNB; in other words, an RLF may occur as strength of a received signal from a serving eNB is not maintained at a sufficient level until a UE successfully completes radio access to a radio link of an alternative eNB.

Therefore, to solve the aforementioned problem, the present specification provides a method for avoiding an RLF to minimize corruption of continuity for providing MCSs by using alternative eNBs.

Terms to be used in the subsequent part of the present specification are defined as follows.

Multi-links refer to a plurality of radio links having connections to a plurality of eNBs.

Multi-links may include a serving link and at least one alternative link.

The serving link refers to a radio link by which a UE is connected to a serving eNB, and the alternative link refers to a radio link by which a UE is connected to an eNB rather than a serving eNB.

The serving link may be expressed by a first radio link, and the alternative link may be expressed by a second radio link.

Here, an eNB other than the serving eNB may be called an alternative eNB, candidate (target) eNB, neighboring eNB, or target eNB.

A serving eNB refers to an eNB from which a UE receives a current service.

An alternative serving eNB represents a new serving eNB replacing a serving eNB when radio link quality of the serving eNB deteriorates (or degrades).

A link connection refers to a radio connection to an eNB and may be expressed by a radio link establishment or radio link setup.

Also, multi-link connection (or establishment) may be expressed by multi-connection or alternative link connection.

In what follows, multi-link establishment and alternative link establishment will be used interchangeably depending on the needs.

Definition of Alternative Link and Operation Thereof

As defined above, multi-connection or multi-link includes a serving link and at least one alternative link.

A serving link refers to a radio link between a UE and a serving eNB, where the serving link generally has both of a Signaling Radio Bearer (SRB) and a Data Radio Bearer (DRB) in the active state.

An alternative link represents a radio link between a UE and at least one alternative eNB, where only the SRB in the inactive state is defined whereas the DRB may not be defined.

An alternative link is activated only by an activation command of a UE (or a serving eNB) and has a state different from an ordinary dormant mode, which may be an event-triggered dormant mode.

In other words, an alternative link connected to an alternative eNB in the SRB inactive state is kept to the sleep mode until a UE (or a serving eNB) issues an activation command.

Also, the UE may receive information about the maximum number of alternative links beforehand through which neighboring alternative eNBs may be connected according to a broadcast message such as SIB from a serving eNB Also, as long as the maximum number of alternative links allowed for a UE is not exceeded, the UE may establish an additional alternative link for a neighboring alternative eNB which satisfies a specific condition (QMCS).

Method for Establishing Multi-Links when Network is Accessed

First, before describing a UE-initiated method for avoiding a Radio Link Failure (RLF) according to the present invention, a method for establishing multi-links when a UE accesses the network will be described briefly for the purpose of understanding.

Here, a UE's access to the network may be an initial network access procedure or a network access procedure for the case in which a Mission Critical Service (MCS) occurs while the UE is in the idle state.

In other words, when a UE accesses the network, the UE may establish an alternative link with an alternative eNB to support an MCS. A method for establishing an alternative link may be applied to both of (1) a case in which there is no need for a UE and an alternative eNB to be synchronized with each other and (2) a case in which a UE and an alternative eNB have to be synchronized with each other.

Here, the case in which there is no need for synchronization corresponds to a 'small cell environment' where timing advance (TA) between a UE and an alternative eNB (or small eNB) is almost zero or an environment where an asynchronous system based on a new waveform is built.

When a UE has multi-links to a plurality of eNBs, the UE holds a connection in the active state (a serving link in the active state) to a serving eNB and holds a connection to an alternative eNB in the inactive state (an alternative link in the inactive state).

The serving link in the active state may indicate an active Signaling Radio Bearer (SRB)/active Data Radio Bearer (DRB) established between a UE and a serving eNB while the alternative link in the inactive state may indicate only the inactive SRB established between a UE and an alternative eNB.

In other words, an inactive SRB may represent a state in which a DRB is not established between a UE and an alternative eNB.

Also, a serving eNB establishes an E-RAB by setting up an S-GW and an S1-U bearer through network access, which indicates that an EPS bearer is established together with an S5/S8 bearer between the S-GW and the P-GW.

Meanwhile, an alternative eNB maintaining an alternative link to the UE establishes an S-GW and an S1-U bearer; since a DRB for the UE is not established, however, the E-RAB is not established.

However, in this case, too, the P-GW and the S5/S8 bearer may be established.

In other words, the UE establishes at least one alternative eNB and an inactive SRB with respect to the MCS but does not establishes an DRB.

As described above, an inactive SRB (or SRB inactive state) has a different state from the conventional (LTE/LTE-A system) dormant mode or dormant state.

The SRB inactive state may be expressed as the SRB inactive mode.

In other words, the conventional dormant mode refers to the mode used for power saving of an RRC connected UE.

For example, when there is no DL data to be received, the UE enters the dormant mode and repeats sleeping and waking up periodically, thereby reducing unnecessary power consumption of the UE.

Meanwhile, the SRB inactive mode (or state) according to the present specification refers to the state in which a UE stays in the sleep mode unless there is a separate SRB active command.

The SRB inactive mode may be defined as the state activated by the UE.

Therefore, the SRB inactive mode may also be expressed by the event-triggered dormant mode.

As described above, when multi-tier/multi-layer eNBs exist within the coverage of the UE (in-coverage situation) or when the UE determines that quality of a serving link is not good enough to receive an MCS, the UE may secure another eNB which guarantees better radio link quality than that of the serving eNB, namely an alternative eNB and alternative radio link, and receive the MCS in a reliable and continuous manner.

Also, according to the active or inactive state of the SRB and DRB of the alternative link between the UE and the alternative eNB, four different modes may be defined as follows.

First mode: SRB inactive and DRB inactive
Second mode: SRB inactive and DRB active
Third mode: SRB active and DRB inactive
Fourth mode: SRB active and DRB active Also, the UE may receive a radio link quality value from a serving eNB and/or alternative eNB. When the radio link quality value received from the serving eNB is considered to be inappropriate for providing an MCS, the UE may replace the serving eNB with an alternative eNB which transmits a radio link quality value appropriate for providing an MCS among the alternative eNBs as a new serving eNB.

Also, among the alternative eNBs, an alternative eNB which has transmitted a radio link quality value inappropriate for providing an MCS may be updated with a new alternative eNB appropriate for providing the MCS.

However, an RLF may occur while the alternative eNB is being replaced with a new serving eNB as the radio link quality value of the serving eNB is inappropriate for providing an MCS. The occurrence of an RLF may degrade continuity of the MCS and thus the present invention proposes a method for avoiding an RLF to solve the problem above.

In what follows, the present invention assumes that a UE is in the SRB active state with a serving eNB but stays in the SRB inactive state with one or more alternative eNBs. At this time, the UE is synchronized to the one or more alternative eNBs not only when the UE is required to be synchronized to the one or more alternative eNBs but also when it is not required to be done that way and obtains C-RNTI received from the corresponding eNBs.

Figure 17:
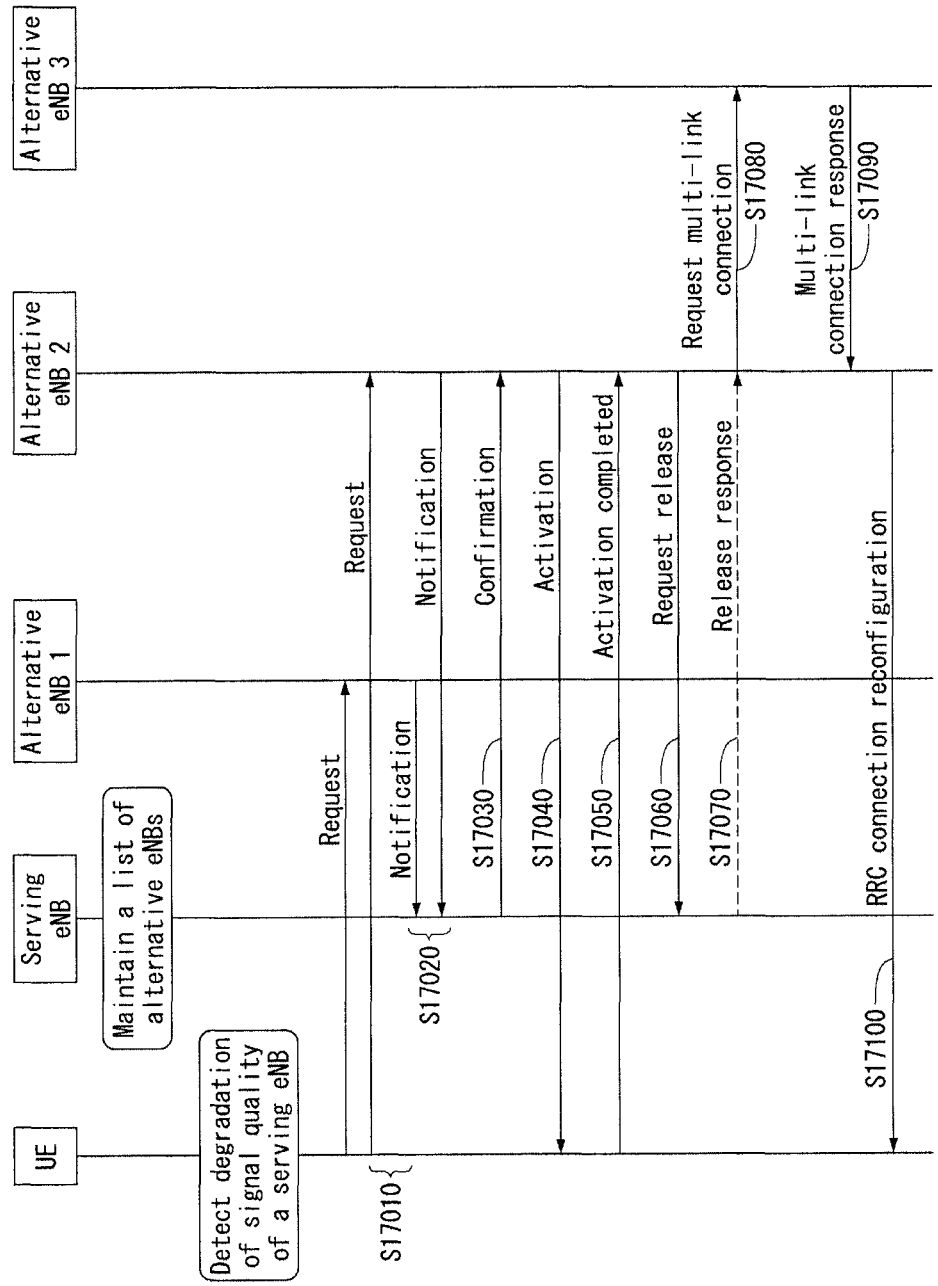
FIG. 17 is a flow diagram illustrating one example of avoiding a Radio Link Failure (RLF) due to degradation of radio link quality of a serving eNB to which the present invention may be applied.

FIG. 17 is a flow diagram illustrating one example of avoiding a Radio

Link Failure (RLF) due to degradation of radio link quality of a serving eNB to which the present invention may be applied.

Referring to FIG. 17, when a UE, which has accessed the network through a serving eNB and established an EPS bearer (namely the UE secures a DRB ID of a radio section and an EPS bearer ID of a network section), detects that the quality of a radio link of a serving eNB has been degraded, the UE may provide a service continuously by activating radio links of one or more alternative eNBs in the SRB inactive state.

More specifically, a serving eNB obtains a list of one or more alternative eNBs in the SRB inactive state and information of a candidate alternative eNB (in what follows, it is denoted as alternative eNB 3) not connected through multi-links.

The UE may continuously monitor signal quality of a radio link of the serving eNB. When the signal quality of a radio link of the serving eNB degrades abruptly while it is being monitored (for example, when one or more continuous "out-of-sync" indications are received from the PHY layer), the UE may inform of the degradation of the signal quality by transmitting a request message for requesting SRB activation to the alternative eNB 1 and alternative eNB 2, which are one or more alternative eNBs connected in the SRB inactive state.

The request message may include a cause field which describes a cause of the SRB activation and information of the alternative eNB 3. At this time, the cause of SRB activation may be radio link failure avoidance indicating the purpose of avoiding a Radio Link Failure (RLF).

The alternative eNB 1 and the alternative eNB 2, which recognize through the request message that the radio link quality of the serving eNB has been degraded, transmits a notification message to the serving eNB S17020.

The notification message includes load state information of each of the alternative eNB 1 and the alternative eNB 2. The load state information may be one of high, medium, or low state depending on the load state of each of the alternative eNBs.

The serving eNB which has received notification messages from the alternative eNB 1 and the alternative eNB 2 determines the more appropriate (or optimal) alternative eNB for providing an MCS between the alternative eNB 1 and the alternative eNB 2 and transmits a confirmation message for confirming SRB activation with respect to the UE S17030. In what follows, descriptions are given under the assumption that the alternative eNB determined by the serving eNB is the alternative eNB 2.

The confirmation message may include a UE identifier for representing the UE, information of the alternative eNB 3, SN status, and S-GW TEID.

Afterwards, the alternative eNB 2 activates the SRB and transmits, to the UE, an activation message including information related to radio resource configuration for the UE S17040.

The UE which has received the activation message transmits, to the alternative eNB 2, an activation completion message including information about alternative eNBs in the SRB inactive state S17050.

Afterwards, the alternative eNB 2 transmits a connection release request message to the serving eNB to request release of an RRC connection between the serving eNB and the UE S17060 and receives a release response message from the serving eNB in response to the connection release request message S17070. At the same time, the alternative eNB 2 transmits a multi-link connection request message to the alternative eNB 3 to form multi-links in the SRB inactive state with the alternative eNB 3 S17080.

The alternative eNB 3 transmits, to the alternative eNB 2, a multi-link connection response message in response to the multi-link connection request message S17090. At this time, the response message includes C-RNTI that the alternative eNB 3 has assigned to the UE.

The alternative eNB 2 which has received the response message transmits an RRC connection reconfiguration message to the UE to transmit the C-RNTI received from the alternative eNB 3 to the UE S17100.

Through the method above, as soon as the UE notices a problem in the PHY layer, the UE activates an SRB to an alternative eNB having multi-links, runs the existing T310 timer, and thereby omits a procedure for recovering a connection after the T310 timer is completed. Therefore, when a radio link failure occurs, states in which an RRC connection is not established may be reduced, and therefore, radio link availability is always secured.

In the present embodiment, the aforementioned step of S17070 may be omitted.

Figure 18:
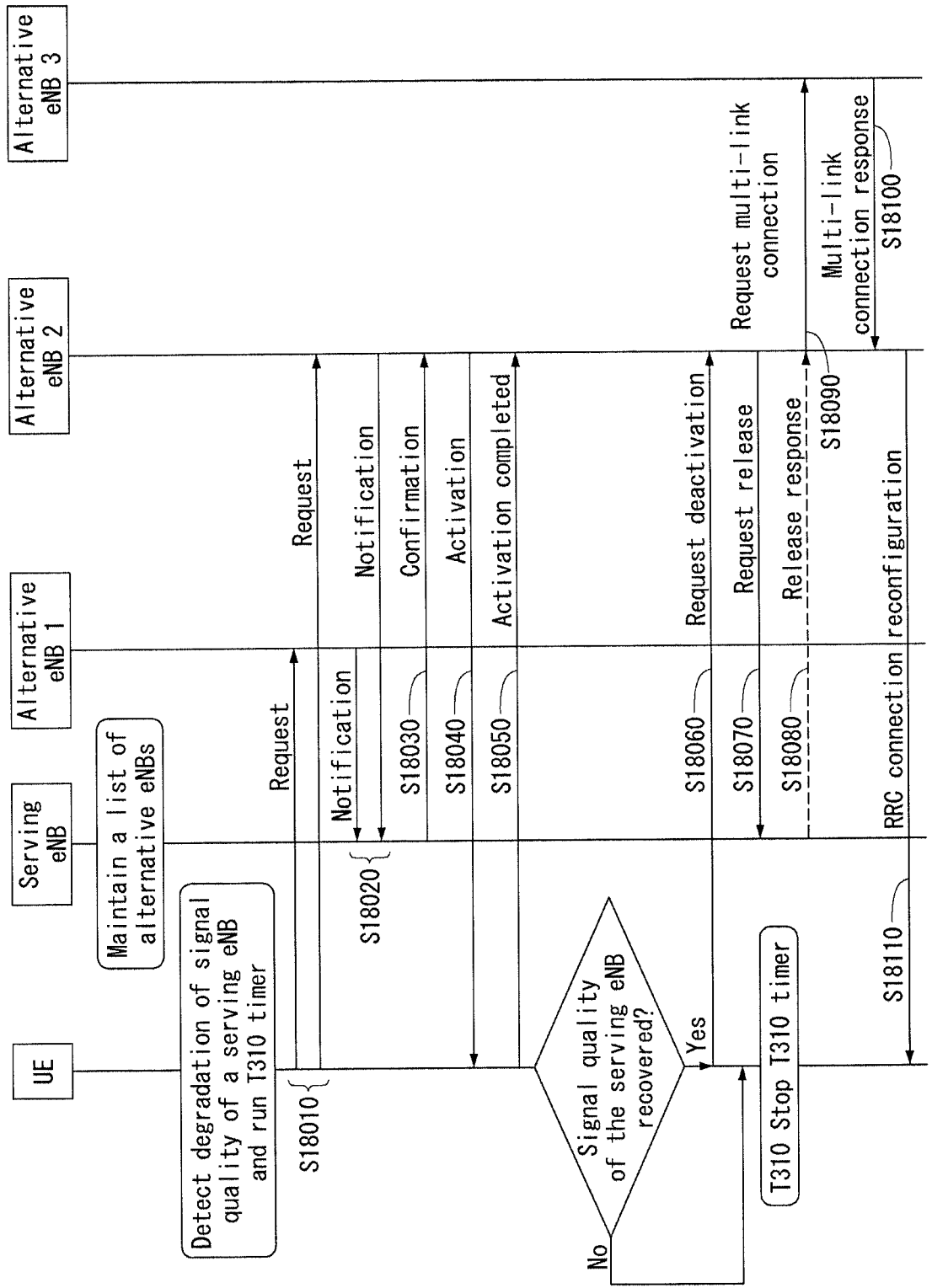
FIG. 18 is a flow diagram illustrating another example of avoiding a Radio Link Failure (RLF) due to degradation of radio link quality of a serving eNB to which the present invention may be applied.

FIG. 18 is a flow diagram illustrating another example of avoiding a Radio Link Failure (RLF) due to degradation of radio link quality of a serving eNB to which the present invention may be applied.

Referring to FIG. 18, different from FIG. 17, if the UE notices a problem in the PHY layer, the UE runs a timer and when a radio link of the serving eNB is recovered before the corresponding timer is completed, deactivates the SRB of an alternative eNB, and maintains a connection to the serving eNB.

More specifically, a serving eNB obtains a list of one or more alternative eNBs in the SRB inactive state and information of a candidate alternative eNB (in what follows, it is denoted as alternative eNB 3) not connected through multi-links.

The UE may continuously monitor signal quality of a radio link of the serving eNB. When the signal quality of a radio link of the serving eNB degrades abruptly while it is being monitored (for example, when one or more continuous "out-of-sync" indications are received from the PHY layer), the UE runs the T310 timer.

Also, the UE may inform of the degradation of the signal quality by transmitting a request message for requesting SRB activation to the alternative eNB 1 and alternative eNB 2, which are one or more alternative eNBs connected in the SRB inactive state S18010.

The request message may include a cause field which describes a cause of the SRB activation, information of the alternative eNB 3, and the T310 timer information. At this time, the cause of SRB activation may be radio link failure avoidance indicating the purpose of avoiding a Radio Link Failure (RLF).

In what follows, since the S18020 step to the S18050 step are the same as the S17020 step to the S17050 step of FIG. 17, descriptions thereof will be omitted.

Afterwards, if radio link quality of the serving link is recovered before the T310 timer expires, the UE transmits a deactivation message to the alternative eNB 2 to again deactivate the SRB of the alternative eNB 2 S18060.

In case radio link quality of the serving eNB is recovered, the alternative eNB 2 waits until the T310 timer expires. When a deactivation request message requesting deactivation of the SRB is received from the UE before the T310 timer expires, the alternative eNB 2 deactivates the activated SRB.

However, when the radio link quality of the serving eNB is not recovered until the T310 timer expires, the alternative eNB 2 transmits a connection release request message to the serving eNB to request release of an RRC connection between the serving eNB and the UE S18070 and receives a release response message from the serving eNB in response to the connection release request message S18080.

In what follows, since the S18090 step to the S18110 step are the same as the S17080 to the S17100 step of FIG. 17, descriptions thereof will be omitted.

Through the method above, even if a radio link of the serving eNB degrades, when the radio link is recovered within a predetermined time period, the UE may not release an RRC connection to the serving eNB. In other words, after the UE discovers a radio link problem of the serving eNB and activates an SRB of an alternative eNB, when the radio link quality of the serving eNB is recovered before the T310 timer expires, the UE deactivates the SRB of the alternative eNB. Therefore, while activating an RRC connection to the alternative eNB, the UE may take into account recovering radio link quality of the serving eNB.

In the present embodiment, the aforementioned step of S18080 may be omitted.

FIG. 17 and FIG. 18 may be applied when an asynchronous system such as a new wave form which does not require to be synchronized is constructed.

Figure 19:
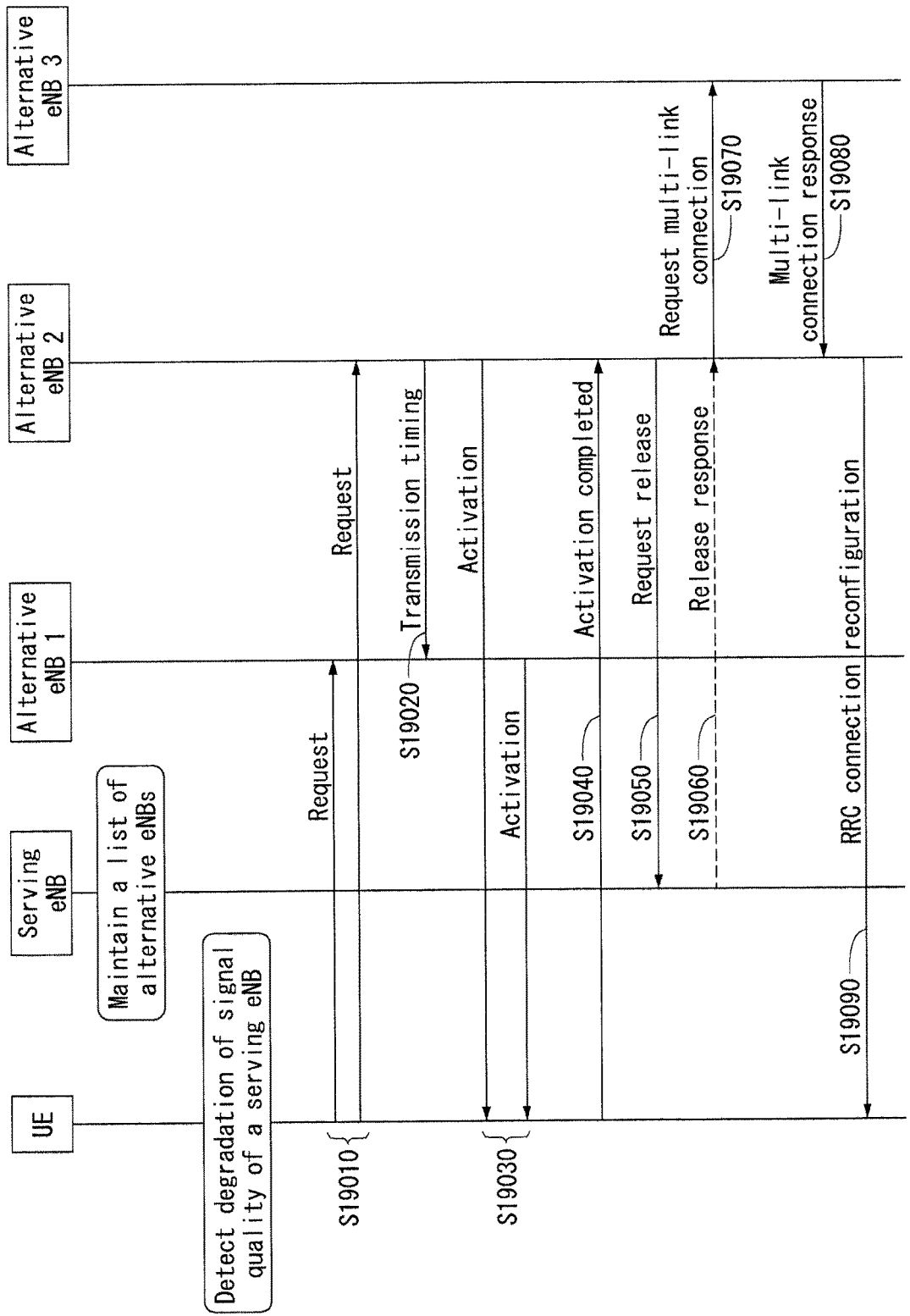
FIG. 19 is a flow diagram illustrating a yet another example of avoiding a Radio Link Failure (RLF) due to degradation of radio link quality of a serving eNB to which the present invention may be applied.

FIG. 19 is a flow diagram illustrating a yet another example of avoiding a Radio Link Failure (RLF) due to degradation of radio link quality of a serving eNB to which the present invention may be applied.

Referring to FIG. 19, when the UE detects degradation of radio link quality of a serving eNB, the UE receives load state information from one or more alternative eNBs and selects a candidate serving eNB that may replace the serving eNB.

More specifically, a serving eNB obtains a list of one or more alternative eNBs in the SRB inactive state and information of a candidate alternative eNB (in what follows, it is denoted as alternative eNB 3) not connected through multi-links.

The UE may continuously monitor signal quality of a radio link of the serving eNB. When the signal quality of a radio link of the serving eNB degrades abruptly while it is being monitored (for example, when one or more continuous "out-of-sync" indications are received from the PHY layer), the UE may inform of the degradation of the signal quality by transmitting a request message for requesting SRB activation to one or more alternative eNBs (in what follows, they are denoted as alternative eNB 1 and alternative eNB 2) connected in the SRB inactive state S19010.

The request message may include a cause field which describes a cause of the SRB activation, synchronization information representing the synchronization order of the alternative eNB 1 and the alternative eNB 2, activation timer, and information of the alternative eNB 3. At this time, the cause of SRB activation may be radio link failure avoidance indicating the purpose of avoiding a Radio Link Failure (RLF).

Also, the synchronization order may be a descending order starting from an alternative eNB with the fastest synchronization with respect to the UE down to the alternative eNB with the slowest synchronization or vice versa. In what follows, the present embodiment is described with an assumption that the alternative eNB having the fastest synchronization is alternative eNB 2.

Also, when an activation completion message is not received until the activation timer expires, alternative eNBs which have not received the activation completion message employs the activation timer to release radio resource configuration for the UE.

In the case of a descending order starting from an alternative eNB having the fastest synchronization, the alternative eNB 2 which has the fastest synchronization transmits a transmission timing message to the remaining alternative eNBs on the basis of information received from the UE S19020.

The transmission timing message may include a UE identifier for representing the UE and a downlink transmission time indicator representing the time at which the alternative eNB 2 transmits a downlink message to the UE.

The transmission timing message may be transmitted simultaneously by other alternative eNBs except for the alternative eNB having the slowest synchronization timing.

Afterwards, the alternative eNB 1 and the alternative eNB 2 activate the inactive SRB set for the UE and transmits an activation message to the UE on the basis of the downlink transmission time indicator and synchronization order S19030. For example, after the alternative eNB 2 which has the fastest synchronization timing transmits the activation message to the UE at the time indicated by the downlink transmission time indicator, the alternative eNB 1 which has the second fastest synchronization timing may transmit an activation message to the UE.

The activation message includes load state information of each of the alternative eNB 1 and the alternative eNB 2; and configuration information related to radio resource configuration for DRB activation of each of the alternative eNBs. The load state information may be one of high, medium, or low state depending on the load state of each of the alternative eNBs.

Through the activation message transmitted from the alternative eNB 1 and the alternative eNB 2, the UE may check load state of each of the alternative eNBs. The UE determines the more appropriate (or optimal) alternative eNB for providing an MCS between the alternative eNB 1 and the alternative eNB 2 and transmits, to the determined eNB, an activation completion message which terminates the SRB activation procedure S19040. In what follows, descriptions are given under the assumption that the alternative eNB determined by the serving eNB is the alternative eNB 2.

Afterwards, when the activation timer transmitted through the request message expires, the alternative eNB 1 deactivates the activated SRB.

The activation completion message may include SN status, S-GW TEID, information of the alternative eNB 1 connected in the SRB inactive state, and information of the alternative eNB 3.

In what follows, since the S19050 step to the S19090 step are the same as the S17060 to the S17100 step of FIG. 17, descriptions thereof will be omitted.

Figure 20:
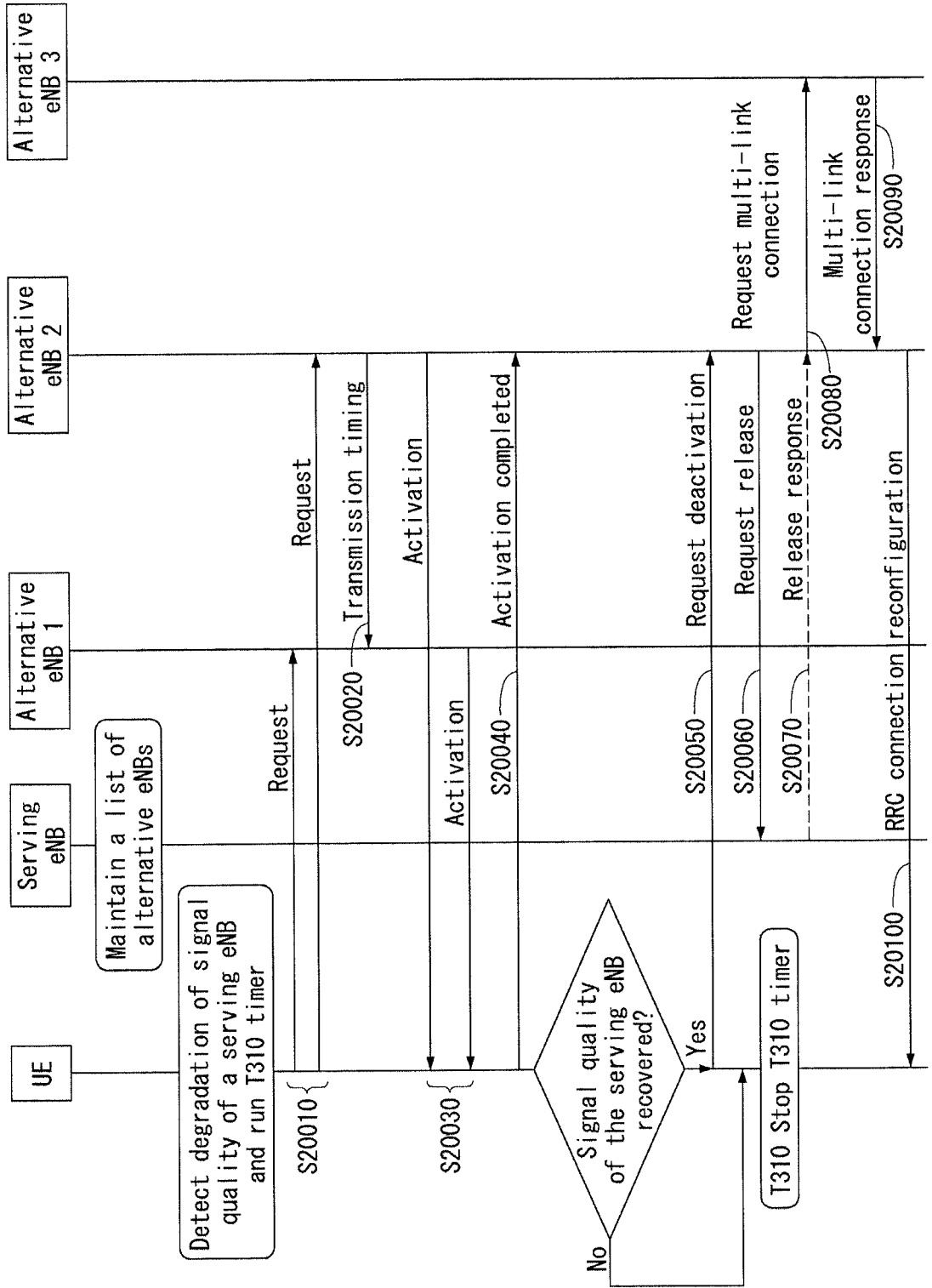
FIG. 20 is a flow diagram illustrating a still another example of avoiding a Radio Link Failure (RLF) due to degradation of radio link quality of a serving eNB to which the present invention may be applied.

FIG. 20 is a flow diagram illustrating a still another example of avoiding a Radio Link Failure (RLF) due to degradation of radio link quality of a serving eNB to which the present invention may be applied.

Referring to FIG. 20, different from FIG. 19, if the UE notices a problem in the PHY layer, the UE runs a timer and when a radio link of the serving eNB is recovered before the corresponding timer is completed, deactivates the SRB of an alternative eNB, and maintains a connection to the serving eNB.

More specifically, a serving eNB obtains a list of one or more alternative eNBs in the SRB inactive state and information of a candidate alternative eNB (in what follows, it is denoted as alternative eNB 3) not connected through multi-links.

The UE may continuously monitor signal quality of a radio link of the serving eNB. When the signal quality of a radio link of the serving eNB degrades abruptly while it is being monitored (for example, when one or more continuous "out-of-sync" indications are received from the PHY layer), the UE runs the T310 timer.

Also, the UE may inform of the degradation of the signal quality by transmitting a request message for requesting SRB activation to the alternative eNB 1 and alternative eNB 2, which are one or more alternative eNBs connected in the SRB inactive state S20010.

The request message may include a cause field which describes a cause of the SRB activation, synchronization information representing the synchronization order of the alternative eNB 1 and the alternative eNB 2, activation timer, information of the alternative eNB 3, and the T310 timer information. At this time, the cause of SRB activation may be radio link failure avoidance indicating the purpose of avoiding a Radio Link Failure (RLF).

Also, the synchronization order may be a descending order starting from an alternative eNB with the fastest synchronization with respect to the UE down to the alternative eNB with the slowest synchronization or vice versa. In what follows, the present embodiment is described with an assumption that the alternative eNB having the fastest synchronization is alternative eNB 2.

Also, when an activation completion message is not received until the activation timer expires, alternative eNBs which have not received the activation completion message employs the activation timer to release radio resource configuration for the UE.

In what follows, since the S20020 step to the S20040 step are the same as the S19020 to the S19040 step of FIG. 19, descriptions thereof will be omitted.

Afterwards, when the activation timer transmitted through the request message expires, the alternative eNB 1 deactivates the activated SRB.

If radio link quality of the serving link is recovered before the T310 timer expires, the UE transmits a deactivation message to the alternative eNB 2 to again deactivate the SRB of the alternative eNB 2 S20050.

In case radio link quality of the serving eNB is recovered, the alternative eNB 2 waits until the T310 timer expires. When a deactivation request message requesting deactivation of the SRB is received from the UE before the T310 timer expires, the alternative eNB 2 deactivates the activated SRB.

However, when the radio link quality of the serving eNB is not recovered until the T310 timer expires, the alternative eNB 2 transmits a connection release request message to the serving eNB to request release of an RRC connection between the serving eNB and the UE 520060 and receives a release response message from the serving eNB in response to the connection release request message S20070.

In what follows, since the S20080 step to the S20100 step are the same as the S17080 to the S17100 step of FIG. 17, descriptions thereof will be omitted.

Figure 21:
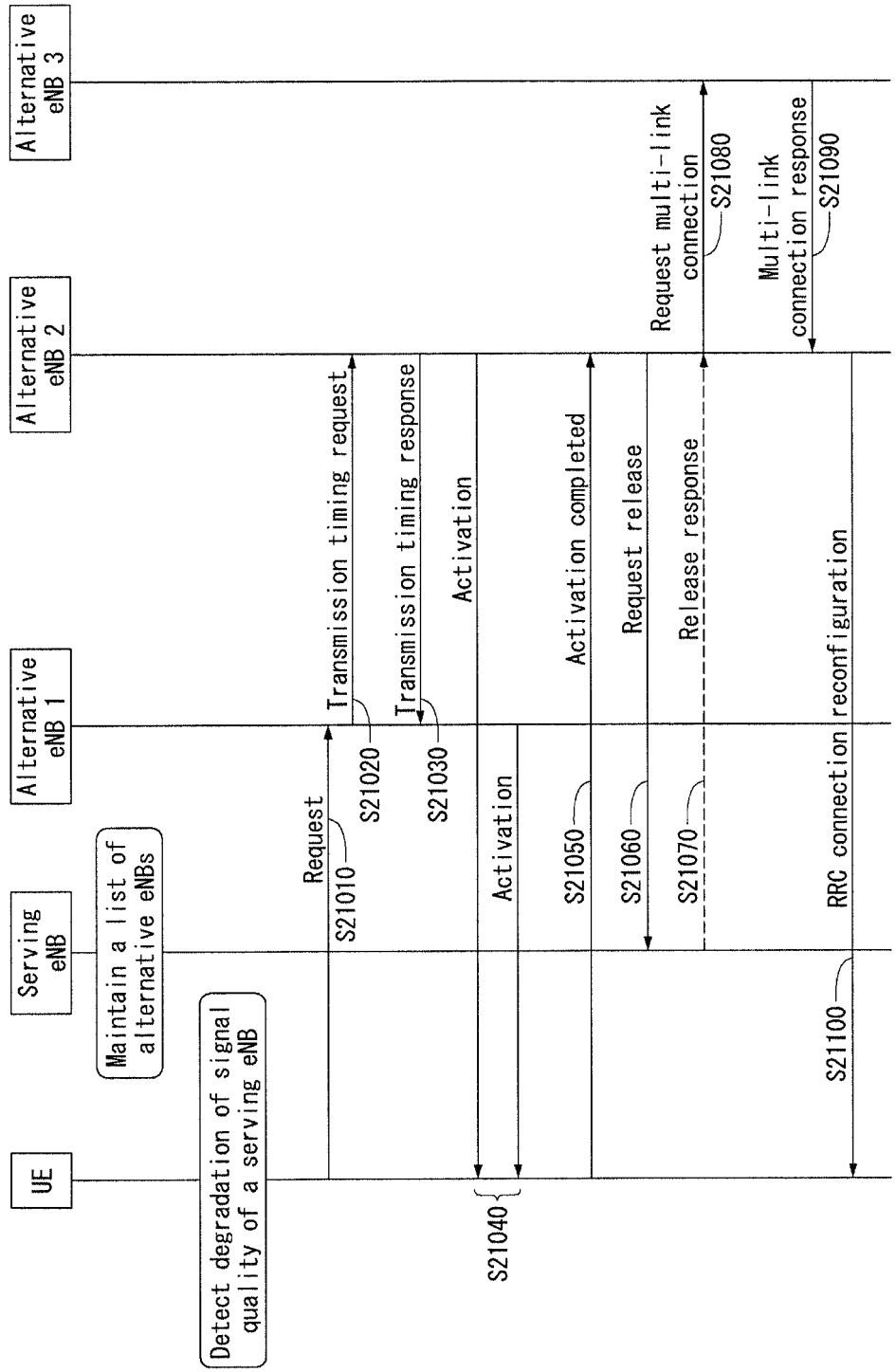
FIG. 21 is a flow diagram illustrating a further still another example of avoiding a Radio Link Failure (RLF) due to degradation of radio link quality of a serving eNB to which the present invention may be applied.

FIG. 21 is a flow diagram illustrating a further still another example of avoiding a Radio Link Failure (RLF) due to degradation of radio link quality of a serving eNB to which the present invention may be applied.

More specifically, a serving eNB obtains a list of one or more alternative eNBs in the SRB inactive state and information of a candidate alternative eNB (in what follows, it is denoted as alternative eNB 3) not connected through multi-links.

The UE may continuously monitor signal quality of a radio link of the serving eNB. When the signal quality of a radio link of the serving eNB degrades abruptly while it is being monitored (for example, when one or more continuous "out-of-sync" indications are received from the PHY layer), the UE may inform of the degradation of the signal quality by transmitting a request message for requesting SRB activation to an alternative eNB having the best radio link quality among one or more alternative eNBs (in what follows, they are denoted as alternative eNB 1 and alternative eNB 2) connected in the SRB inactive state 521010. In what follows, the present embodiment is described with an assumption that the alternative eNB having the best radio link quality is alternative eNB 1.

The request message may include a cause field which describes a cause of the SRB activation, synchronization information representing the synchronization order of the alternative eNB 1 and the alternative eNB 2, activation timer, and list information of alternative eNBs in the SRB inactive state. At this time, the cause of SRB activation may be radio link failure avoidance indicating the purpose of avoiding a Radio Link Failure (RLF).

Also, the synchronization order may be a descending order starting from an alternative eNB with the fastest synchronization with respect to the UE down to the alternative eNB with the slowest synchronization or vice versa. In what follows, the present embodiment is described with an assumption that the alternative eNB having the fastest synchronization is alternative eNB 2.

Also, when an activation completion message is not received until the activation timer expires, alternative eNBs which have not received the activation completion message employs the activation timer to release radio resource configuration for the UE.

The alternative eNB 1 which has received the request message transmits a transmission timing request message to the alternative eNB 2 which is another alternative eNB in the SRB inactive state S21020.

The transmission timing message may include a UE identifier for representing the UE, synchronization information received from the UE, a downlink transmission time indicator representing the time at which the alternative eNB 1 transmits a downlink message to the UE, and an inquiry indicator inquiring about the time at which a downlink message is transmitted.

The alternative eNB 2 which has received the transmission timing message transmits a transmission timing response message to the alternative eNB 1 in response to the transmission timing message S21030.

The transmission timing response message may include a UE identifier for representing the UE and a downlink transmission time indicator representing the time at which the alternative eNB 2 transmits a downlink message.

Afterwards, the alternative eNB 1 and the alternative eNB 2 activate the inactive SRB set for the UE and transmits an activation message to the UE on the basis of the downlink transmission time indicator and synchronization order S21040. For example, after the alternative eNB 2 which has the fastest synchronization timing transmits the activation message to the UE at the time indicated by the downlink transmission time indicator, the alternative eNB 1 which has the second fastest synchronization timing may transmit an activation message to the UE.

The activation message includes load state information of each of the alternative eNB 1 and the alternative eNB 2; and configuration information related to radio resource configuration for SRB activation of each of the alternative eNBs. The load state information may be one of high, medium, or low state depending on the load state of each of the alternative eNBs.

Through the activation message transmitted from the alternative eNB 1 and the alternative eNB 2, the UE may check load state of each of the alternative eNBs. The UE determines the more appropriate (or optimal) alternative eNB for providing an MCS between the alternative eNB 1 and the alternative eNB 2 and transmits, to the determined eNB, an activation completion message which terminates the SRB activation procedure S21050. In what follows, descriptions are given under the assumption that the alternative eNB determined by the serving eNB is the alternative eNB 2.

Afterwards, when the activation timer transmitted through the request message expires, the alternative eNB 1 deactivates the activated SRB.

The activation completion message may include SN status, S-GW TEID, information of the alternative eNB 1 connected in the SRB inactive state, and information of the alternative eNB 3.

In what follows, since the S21060 step to the S21100 step are the same as the S17060 to the S17100 step of FIG. 17, descriptions thereof will be omitted.

Figure 22:
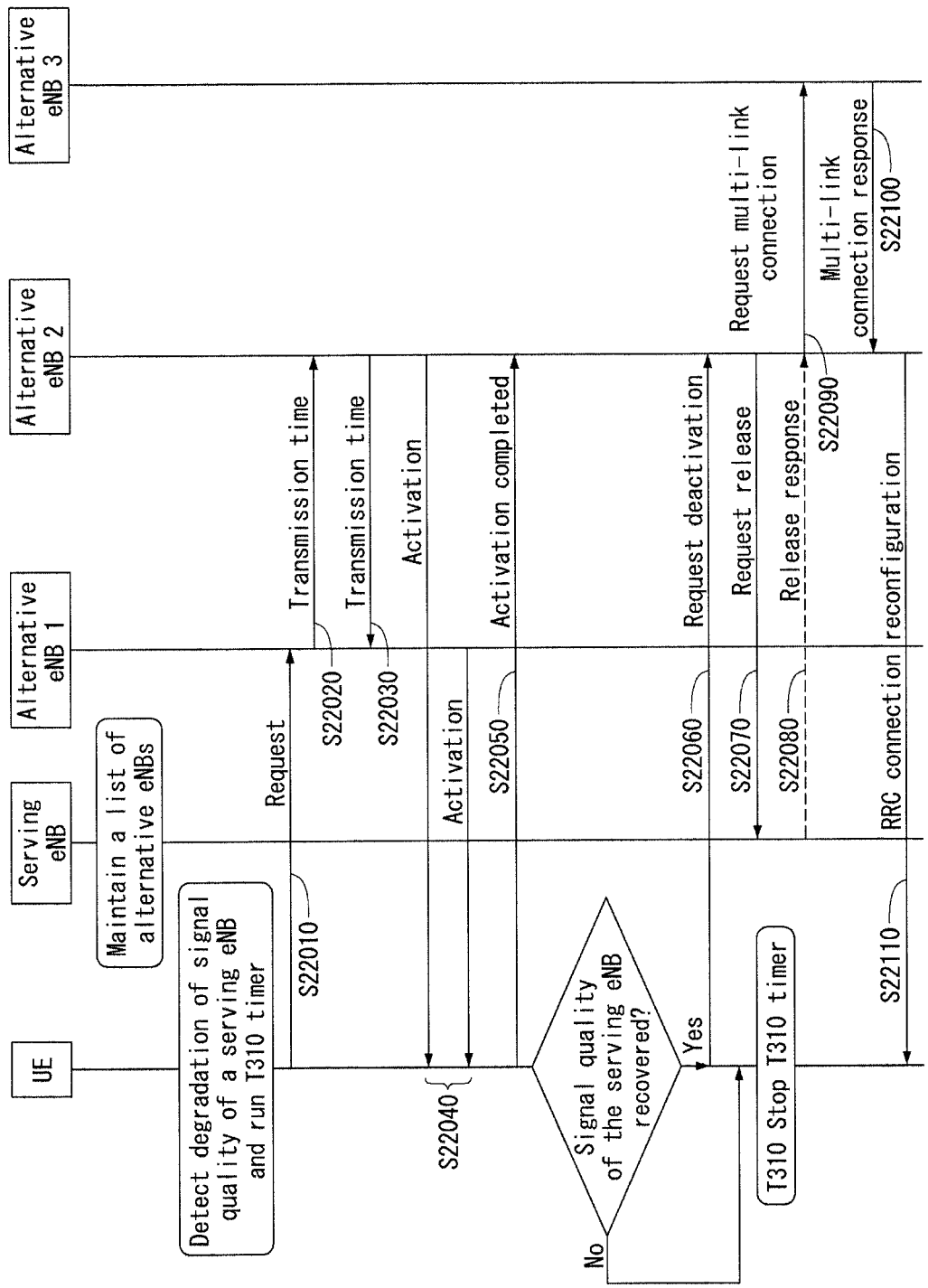
FIG. 22 is a flow diagram illustrating another additional example of avoiding a Radio Link Failure (RLF) due to degradation of radio link quality of a serving eNB to which the present invention may be applied.

FIG. 22 is a flow diagram illustrating another additional example of avoiding a Radio Link Failure (RLF) due to degradation of radio link quality of a serving eNB to which the present invention may be applied.

Referring to FIG. 22, different from FIG. 21, if the UE notices a problem in the PHY layer, the UE runs a timer and when a radio link of the serving eNB is recovered before the corresponding timer is completed, deactivates the SRB of an alternative eNB, and maintains a connection to the serving eNB.

More specifically, a serving eNB obtains a list of one or more alternative eNBs in the SRB inactive state and information of a candidate alternative eNB (in what follows, it is denoted as alternative eNB 3) not connected through multi-links.

The UE may continuously monitor signal quality of a radio link of the serving eNB. When the signal quality of a radio link of the serving eNB degrades abruptly while it is being monitored (for example, when one or more continuous "out-of-sync" indications are received from the PHY layer), the UE runs the T310 timer.

Also, the UE may inform of the degradation of the signal quality by transmitting a request message for requesting SRB activation to the alternative eNB exhibiting the best radio link quality among one or more alternative eNBs (in what follows, they are denoted as alternative eNB 1 and alternative eNB 2) S22010.

The request message may include a cause field which describes a cause of the SRB activation, synchronization information representing the synchronization order of the alternative eNB 1 and the alternative eNB 2, activation timer, and list information of alternative eNBs in the SRB inactive state. At this time, the cause of SRB activation may be radio link failure avoidance indicating the purpose of avoiding a Radio Link Failure (RLF).

Also, the synchronization order may be a descending order starting from an alternative eNB with the fastest synchronization with respect to the UE down to the alternative eNB with the slowest synchronization or vice versa. In what follows, the present embodiment is described with an assumption that the alternative eNB having the fastest synchronization is alternative eNB 2.

Also, when an activation completion message is not received until the activation timer expires, alternative eNBs which have not received the activation completion message employs the activation timer to release radio resource configuration for the UE.

In what follows, since the S22020 step to the S22050 step are the same as the S21020 to the S21050 step of FIG. 21, descriptions thereof will be omitted.

Afterwards, when the activation timer transmitted through the request message expires, the alternative eNB 1 deactivates the activated SRB.

If radio link quality of the serving link is recovered before the T310 timer expires, the UE transmits a deactivation message to the alternative eNB 2 to again deactivate the SRB of the alternative eNB 2 S22060.

In case radio link quality of the serving eNB is recovered, the alternative eNB 2 waits until the T310 timer expires. When a deactivation request message requesting deactivation of the SRB is received from the UE before the T310 timer expires, the alternative eNB 2 deactivates the activated SRB.

However, when the radio link quality of the serving eNB is not recovered until the T310 timer expires, the alternative eNB 2 transmits a connection release request message to the serving eNB to request release of an RRC connection between the serving eNB and the UE 522070 and receives a release response message from the serving eNB in response to the connection release request message S22080.

In what follows, since the S22090 step to the S22110 step are the same as the S17080 to the S17100 step of FIG. 17, descriptions thereof will be omitted.

The embodiments described in FIG. 19 to FIG. 22 may be applied when an asynchronous system such as a new wave form that does not require to be synchronized is not constructed, namely when eNBs are not synchronized with each other.

FIGS. 23 to 28 compare recovery time from a Radio Link Failure (RLF) according to the present invention.

Referring to FIGS. 23 to 28, the time consumed for performing a method for recovering from an RLF according to the embodiments of FIGS. 17 to 22 may be compared with the time consumed for performing the conventional methods.

At this time, it is assumed that the T310 timer uses the minimum value of 50 ms among 50 ms, 100 ms, 200 ms, 500 ms, 1000 ms, and 2000 ms; RRC message transfer delay uses 1 ms; message processing delay due to UE/eNB uses 4 ms; and X2 message transfer delay between eNBs uses 5 ms.

Also, with respect to resource allocation for RRC message transmission, the message transfer delay, which deals with a Scheduling Request (SR), UL grant for Buffer Status Report (BSR), bSR, or UL grant for data, is assumed to be 1 ms; and processing delay is assumed to be 3 ms.

Also, the average waiting time for sending a first SR is assumed to be 0.5 ms (a total of 16 ms).

FIG. 23 compares the embodiment of FIG. 17 with the existing method for recovering from an RLF, and FIG. 24 compares the embodiment of FIG. 18 with the existing method for recovering from an RLF.

Referring to FIGS. 23 and 24, in the case of RLF avoidance described with reference to FIGS. 17 and 18, after detecting degradation of radio link quality of a serving eNB, the UE expects an RLF to occur and changes alternative eNBs in the SRB inactive state into the SRB active state before the T310 timer expires. Therefore, the time period during which the UE is not in the RRC connected state may be shortened.

Also, after an RLF is occurred, the UE reports the eNB which has performed the RRC connection re-establishment procedure of the occurrence of the RLF and thereby omits the procedure of making the corresponding eNB transmit an RLF indication to the eNB in which the RLF has occurred.

FIG. 25 compares the embodiment of FIG. 19 with the existing method for recovering from an RLF, and FIG. 26 compares the embodiment of FIG. 20 with the existing method for recovering from an RLF.

Referring to FIGS. 25 and 26, in the case of RLF avoidance described with reference to FIGS. 19 and 20, after detecting degradation of radio link quality of a serving eNB, the UE expects an RLF to occur and changes alternative eNBs in the SRB inactive state into the SRB active state before the T310 timer expires. Therefore, the time period during which the UE is not in the RRC connected state may be shortened.

However, in this case, as the number of alternative eNBs in the SRB inactive state is increased, transmission and processing of RRC messages (for example, uplink resource allocation message, request message, and activation message) transmitted from the UE to alternative eNBs and then to the UE is performed sequentially, a delay may be generated due to the aforementioned transmission and processing.

Also, after an RLF is occurred, the UE reports the eNB which has performed the RRC connection re-establishment procedure of the occurrence of the RLF and thereby omits the procedure of making the corresponding eNB transmit an RLF indication to the eNB in which the RLF has occurred.

FIG. 27 compares the embodiment of FIG. 21 with the existing method for recovering from an RLF, and FIG. 28 compares the embodiment of FIG. 22 with the existing method for recovering from an RLF.

Referring to FIGS. 25 and 26, in the case of RLF avoidance described with reference to FIGS. 19 and 20, after detecting degradation of radio link quality of a serving eNB, the UE expects an RLF to occur and changes alternative eNBs in the SRB inactive state into the SRB active state before the T310 timer expires. Therefore, the time period during which the UE is not in the RRC connected state may be shortened.

However, in this case, as the number of alternative eNBs in the SRB inactive state is increased, transmission and processing of RRC messages (for example, activation message) transmitted from the alternative eNBs to the UE is performed sequentially, a delay may be generated due to the aforementioned transmission and processing.

Also, after an RLF is occurred, the UE reports the eNB which has performed the RRC connection re-establishment procedure of the occurrence of the RLF and thereby omits the procedure of making the corresponding eNB transmit an RLF indication to the eNB in which the RLF has occurred.

Figure 29:
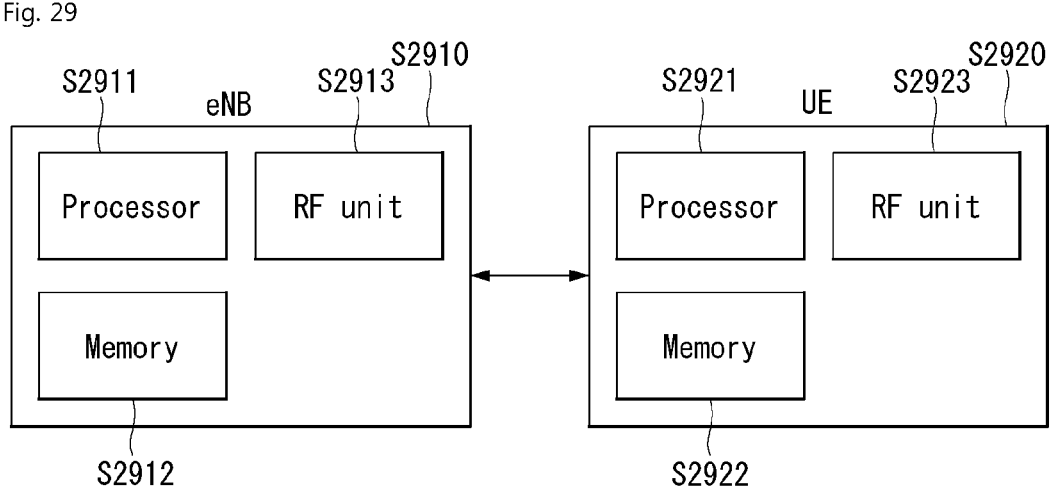
FIG. 29 is a block diagram illustrating one example of a wireless device in which methods according to the present invention may be implemented.

FIG. 29 is a block diagram illustrating one example of a wireless device in which methods according to the present invention may be implemented.

In the figure, the wireless device may be a network entity, eNB, or UE; and the eNB includes both of a macro eNB and a small eNB.

As shown in FIG. 29, the eNB 2910 and the UE 2920 include a processor 2911, 2921, memory 2912, 2922, and RF unit (transceiver, communication unit) 2913, 2923.

In addition to the above, the eNB and the UE may further include an input unit and an output unit.

The RF unit 2913, 2923, processor 2911, 2921, input unit, output unit, and memory 2912, 2922 are functionally connected to each other to perform a method according to the present invention.

The RF unit 2913, 2923 receives information generated by the Physical Layer (PHY) protocol, moves the received information to the Radio-Frequency (RF) spectrum, and transmits the moved information through an antenna after performing filtering and amplification thereof. Also, the communication unit moves a Radio Frequency (RF) signal received from the antenna to a frequency band in which the received signal may be processed according to the PHY protocol and performs filtering on the signal.

And the communication unit may include a switch function for switching between the transmission and the reception function.

The processor 2911, 2921 implements a function, process and/or method proposed by the present invention. Layers of radio interface protocols may be implemented by the processor.

The processor may also be called a controller, control unit, or computer.

The memory 2912, 2922, being connected to the processor, stores protocols or parameters required for performing a method of the present invention.

The processor 2911, 2921 may include Application-Specific Integrated Circuit (ASIC), other chipsets, logical circuits and/or data processing device. The memory may include Read-Only Memory (ROM), Random Access Memory (RAM), flash memory, memory card, storage medium and/or other storage device. The communication unit may include a baseband circuit for processing a radio signal. When the embodiments are implemented by software, the methods described above may be implemented in the form of a module (process or function) which performs the functions described above.

A module may be stored in the memory and executed by the processor. The memory may be installed inside or outside the processor and may be connected to the processor via various well-known means.

The output unit (or display unit) is controlled by the processor and outputs information output from the processor together with key input signals generated by the key input unit and various types of information coming from the processor.

In this document, for the convenience of description, the present invention has been described according to the respective drawings; however, it is equally possible to design a new embodiment by merging the embodiments described in the respective drawings. Also, depending on the needs of those skilled in the art, designing a computer-readable recording medium in a computer storing a program for running the embodiments previously described also belongs to the technical scope of the present invention.

The method according to the present invention is not limited to the embodiments described above, but all or part of the embodiments may be combined selectively so that various modifications may be made to the embodiments.

Meanwhile, the method according to the present invention may be implemented in the form of processor-readable program codes in a recording medium that may be read by a processor installed in a network device. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet.

Also, the processor-readable recording medium may be distributed over computer systems connected to each other through a network so that processor-readable codes may be stored and executed in a distributed manner.

Since various substitutions, modifications, and variations of the present invention may be made without departing from the technical principles and scope of the present invention by those skilled in the art to which the present invention belongs, the present invention is not limited to the embodiments described above and appended drawings.

INDUSTRIAL APPLICABILITY

This document discloses an RRC connection method in a wireless communication system with examples based on the 3GPP LTE/LTE-A system; however, the present invention may also be applied to various other types of wireless communication systems in addition to the 3GPP LTE/LTE-A system.

The invention claimed is:

1. A method for transmitting and receiving data in a wireless communication system supporting a low latency service, the method performed by a user equipment (UE) and comprising:

receiving, from a serving base station, information on a maximum number of alternative links wherein based on the information on the maximum number of alternative links, a plurality of alternative links are established between (i) the UE and (ii) a plurality of alternative base stations, wherein the plurality of alternative links are a link that only a Signaling Radio Bearer (SRB) in an inactive state is configured without configuring a Data Radio Bearer (DRB), wherein a serving link established between the UE and the serving base station is a link that both a SRB in an active state and the DRB are configured, and wherein the SRB in the inactive state is kept to a sleep mode until the UE transmits a request message for a SRB activation for the SRB in the inactive state to the plurality of alternative base stations;

transmitting the request message to the plurality of alternative base stations when detecting degradation of the serving link, wherein the request message includes an activation timer, and wherein a radio resource configuration configured to the UE by an alternative base station is released based on the activation timer when an activation completion message is not received by the alternative base station until the activation timer expires;

receiving, from the plurality of alternative base stations, an activation message including load status information of the plurality of alternative base stations in response to the request message;

selecting a candidate serving base station among the plurality of alternative base stations, based on the load status information; and transmitting the activation completion message to the candidate serving base station, wherein the request message comprises a cause field indicating a reason of SRB activation, and wherein the reason of SRB activation is radio link failure avoidance of the serving base station.

2. The method of claim 1, wherein the request message further comprises a synchronization information indicating a synchronization order among the plurality of alternative base stations, and wherein the activation message is transmitted according to the synchronization order.

3. The method of claim 1, wherein a synchronization order is a sequence of fast synchronization or a sequence of slow synchronization from the UE.

4. The method of claim 1, wherein the load status information is one of high, medium, or low state.

5. The method of claim 1, wherein the activation message further comprises configuration information related to configuring radio resources of the plurality of alternative base stations.

6. The method of claim 1, wherein the activation completion message comprises at least one of list information of other alternative base stations in SRB inactive state or alternative base station information indicating a candidate alternative base station for setting up an alternative link.

7. The method of claim 6, further comprising:
receiving, from the candidate serving base station, an RRC (Radio Resource Control) connection reconfiguration message including C-RNTI (Cell-Radio Network Temporary Identifier) assigned to the UE by the candidate alternative base station to which an alternative link for the UE is established.

8. The method of claim 1, wherein the request message further comprises timer information representing a timer for discovering the radio link failure.

9. The method of claim 8, further comprising:
starting the timer, when degradation of radio link quality of the serving base station is detected,
wherein the request message is transmitted before starting the timer; and
transmitting an inactivation request message requesting inactivation of a SRB of a candidate serving base station to the candidate serving base station, when quality of the radio link is recovered before the timer is completed.

10. The method of claim 1, wherein load status of the candidate serving base station is the lowest one among the plurality of alternative base stations.

11. A user equipment (UE) for transmitting and receiving data in a wireless communication system supporting a low latency service, the UE comprising:
a communication unit configured to transmit and receive a radio signal to and from an external communication device; and
a processor functionally connected to the communication unit,
wherein the processor is configured to:
receive, from a serving base station, information on a maximum number of alternative links
wherein based on the information on the maximum number of alternative links, a plurality of alternative links are established between (i) the UE and (ii) a plurality of alternative base stations,
wherein the plurality of alternative links are a link that only a Signaling Radio Bearer (SRB) in an inactive state is configured without configuring a Data Radio Bearer (DRB),
wherein a serving link established between the UE and the serving base station is a link that both a SRB in an active state and the DRB are configured, and
wherein the SRB in the inactive state is kept to a sleep mode until the UE transmits a request message for a SRB activation for the SRB in the inactive state to the plurality of alternative base stations;
transmit the request message to the plurality of alternative base stations when detecting degradation of the serving link radio link,
wherein the request message includes an activation timer, and
wherein a radio resource configuration configured to the UE by an alternative base station is released based on the activation timer when an activation completion message is not received by the alternative base station until the activation timer expires;
receive, from the plurality of alternative base stations, an activation message including load status information of the plurality of alternative base stations in response to the request message;
select a candidate serving base station among the plurality of alternative base stations, based on the load status information; and
transmit the activation completion message to the candidate serving base station,
wherein the request message comprises a cause field indicating a reason of SRB activation, and
wherein the reason of SRB activation is radio link failure avoidance of the serving base station.

* * * * *